US011663158B2

(12) United States Patent
DiRienzo

(10) Patent No.: US 11,663,158 B2
(45) Date of Patent: May 30, 2023

(54) EMPIRICAL DATA GATHERED BY AMBIENT COMPUTER OBSERVATION OF A PERSON ARE ANALYZED TO IDENTIFY AN INSTANCE OF A PARTICULAR BEHAVIOR AND TO RESPOND TO ITS IDENTIFICATION

(71) Applicant: Andrew L. DiRienzo, Elizaville, NY (US)

(72) Inventor: Andrew L. DiRienzo, Elizaville, NY (US)

( * ) Notice: Subject to any disclaimer, the term of this patent is extended or adjusted under 35 U.S.C. 154(b) by 0 days.

(21) Appl. No.: 17/525,009

(22) Filed: Nov. 12, 2021

(65) Prior Publication Data

US 2022/0138145 A1 May 5, 2022

Related U.S. Application Data

(63) Continuation of application No. 16/800,364, filed on Feb. 25, 2020, now Pat. No. 11,216,410, which is a
(Continued)

(51) Int. Cl.
*G06F 16/11* (2019.01)
*G06F 16/21* (2019.01)
(Continued)

(52) U.S. Cl.
CPC ............ *G06F 16/113* (2019.01); *G06F 16/21* (2019.01); *G06F 16/22* (2019.01);
(Continued)

(58) Field of Classification Search
CPC ........ G06F 16/113; G06F 16/21; G06F 16/22; G06F 16/24553; G06F 21/604;
(Continued)

(56) References Cited

U.S. PATENT DOCUMENTS 5,710,884 A 1/1998 Dedrick
5,727,129 A 3/1998 Barrett
(Continued)

OTHER PUBLICATIONS

Lane, Nicholas, et al., "BeWell: A Smartphone Application to Monitor, Model and Promote Wellbeing", 5th International Conference on Pervasive Computing Technologies for Healthcare, Dublin, Ireland, May 23-26, 2011, 8 pages.*
(Continued)

*Primary Examiner* — Robert Stevens
(74) *Attorney, Agent, or Firm* — Dicke, Billig & Czaja, PLLC

(57) ABSTRACT

Computer systems configured to correlate instances of empirical data, gathered from ambient observation of a person, as being potentially relevant to each other vis-à-vis one particular behavior. In a behavior-identification-process, a pair of correlated instances of empirical data is analyzed to identify it as an instance of the one particular behavior. Such computer systems facilitate transmission of a digital message, the content of which may be determined in response to the instance of the one particular behavior. The content of some digital messages may include experiments performed by such computer systems on the person, to test the validity of the behavior-identification-process. The behavior-identification-process can then be updated with the observed responses of the person, and with the results of the experiments. These experiments and the updating of the behavior-identification-process might be performed by such computer systems to autonomously refine the behavior-identification-process.

11 Claims, 8 Drawing Sheets

Related U.S. Application Data continuation of application No. 15/411,028, filed on Jan. 20, 2017, now Pat. No. 10,614,029, which is a continuation of application No. 14/034,231, filed on Sep. 23, 2013, now Pat. No. 9,607,025.

(60) Provisional application No. 61/744,394, filed on Sep. 24, 2012.

(51) Int. Cl.
| | |
|---|---|
| *G06F 16/22* | (2019.01) |
| *G06F 16/2455* | (2019.01) |
| *G06Q 30/02* | (2012.01) |
| *G06Q 50/00* | (2012.01) |
| *G06F 21/60* | (2013.01) |
| *G06Q 30/0201* | (2023.01) |
| *G06Q 30/0251* | (2023.01) |

(52) U.S. Cl.
CPC ...... *G06F 16/24553* (2019.01); *G06F 21/604* (2013.01); *G06Q 30/02* (2013.01); *G06Q 30/0201* (2013.01); *G06Q 30/0269* (2013.01); *G06Q 50/01* (2013.01)

(58) Field of Classification Search
CPC .... G06Q 50/01; G06Q 30/02; G06Q 30/0201; G06Q 30/0269
USPC ........................................................ 707/667
See application file for complete search history.

(56) References Cited

U.S. PATENT DOCUMENTS

| | | | |
|---|---|---|---|
| 5,848,396 A | 12/1998 | Gerace | |
| 5,991,735 A | 11/1999 | Gerace | |
| 6,185,534 B1 | 2/2001 | Breese et al. | |
| 6,192,381 B1 | 2/2001 | Stiegemeier et al. | |
| 6,212,502 B1 | 4/2001 | Ball et al. | |
| 6,249,282 B1 | 6/2001 | Sutcliffe et al. | |
| 6,571,216 B1 | 5/2003 | Garg et al. | |
| 6,701,362 B1 | 3/2004 | Subramonian et al. | |
| 6,795,808 B1 | 9/2004 | Strubbe et al. | |
| 6,842,877 B2* | 1/2005 | Robarts | G06F 21/6245 |
| | | | 715/740 |
| 6,904,408 B1 | 6/2005 | McCarthy et al. | |
| 6,917,902 B2 | 7/2005 | Alexander | |
| 7,055,168 B1 | 5/2006 | Errico et al. | |
| 7,137,892 B2 | 11/2006 | Sitrick | |
| 7,233,684 B2 | 6/2007 | Fedorovskaya et al. | |
| 7,249,312 B2 | 7/2007 | Jasper et al. | |
| 7,269,516 B2 | 9/2007 | Brunner et al. | |
| 7,313,621 B2 | 12/2007 | Gudorf et al. | |
| 7,319,780 B2 | 1/2008 | Fedorovskaya et al. | |
| 7,409,632 B1 | 8/2008 | DiRienzo | |
| 7,418,116 B2 | 8/2008 | Fedorovskaya et al. | |
| 7,614,001 B2* | 11/2009 | Abbott | G06F 1/163 |
| | | | 715/740 |
| 7,694,129 B2 | 4/2010 | DiRienzo | |
| 7,809,740 B2 | 10/2010 | Chung et al. | |
| 7,877,706 B2 | 1/2011 | Albertson et al. | |
| 7,894,448 B1 | 2/2011 | Lillibridge et al. | |
| 7,949,722 B1 | 5/2011 | Ullman et al. | |
| 3,005,724 A1 | 8/2011 | Dunning et al. | |
| 8,010,400 B2 | 8/2011 | Mascarenhas | |
| 8,010,402 B1 | 8/2011 | Sharma et al. | |
| 8,032,714 B2 | 10/2011 | Musumeci et al. | |
| 8,051,468 B2 | 11/2011 | Davis et al. | |
| 8,218,871 B2 | 7/2012 | Angell et al. | |
| 8,254,633 B1 | 8/2012 | Moon et al. | |
| 8,345,935 B2 | 1/2013 | Angell et al. | |
| 8,380,784 B2 | 2/2013 | Zhu et al. | |
| 8,489,115 B2* | 7/2013 | Rodriguez | G01C 21/3629 |
| | | | 455/456.1 |
| 8,627,013 B2 | 1/2014 | Musumeci et al. | |
| 8,635,227 B2 | 1/2014 | Sankhla et al. | |
| 8,655,916 B2 | 2/2014 | Roy | |
| 8,719,200 B2 | 5/2014 | Beilby et al. | |
| 8,798,995 B1 | 8/2014 | Edara | |
| 8,892,461 B2 | 11/2014 | Lau et al. | |
| 9,349,100 B2 | 5/2016 | Kozloski et al. | |
| 2002/0111172 A1 | 8/2002 | DeWolf et al. | |
| 2002/0147766 A1 | 10/2002 | Vanska et al. | |
| 2002/0174230 A1 | 11/2002 | Gudorf et al. | |
| 2004/0049478 A1 | 3/2004 | Jasper et al. | |
| 2004/0158569 A1 | 8/2004 | Evans et al. | |
| 2004/0210159 A1 | 10/2004 | Kibar | |
| 2004/0225681 A1 | 11/2004 | Chaney et al. | |
| 2005/0144158 A1 | 6/2005 | Capper et al. | |
| 2005/0154701 A1 | 7/2005 | Parunak et al. | |
| 2006/0136528 A1 | 6/2006 | Martin et al. | |
| 2006/0224552 A1 | 10/2006 | Riezler et al. | |
| 2006/0293921 A1 | 12/2006 | McCarthy et al. | |
| 2007/0033084 A1 | 2/2007 | Mascarenhas | |
| 2007/0073799 A1 | 3/2007 | Adjali et al. | |
| 2007/0112713 A1 | 5/2007 | Seaman et al. | |
| 2007/0118802 A1 | 5/2007 | Gerace et al. | |
| 2007/0124226 A1 | 5/2007 | Garner, Jr. | |
| 2007/0124336 A1 | 5/2007 | Arellano | |
| 2007/0201731 A1 | 8/2007 | Fedorovskaya et al. | |
| 2007/0208728 A1 | 9/2007 | Zhang et al. | |
| 2007/0236330 A1 | 10/2007 | Cho et al. | |
| 2007/0239517 A1 | 10/2007 | Chung et al. | |
| 2008/0109429 A1 | 5/2008 | Petrin | |
| 2008/0162537 A1 | 7/2008 | Mancini | |
| 2009/0006295 A1 | 1/2009 | Angell et al. | |
| 2009/0138546 A1 | 5/2009 | Cruzada | |
| 2009/0157473 A1 | 6/2009 | Belz et al. | |
| 2009/0254417 A1 | 10/2009 | Beilby et al. | |
| 2009/0307176 A1 | 12/2009 | Jeong et al. | |
| 2010/0030772 A1 | 2/2010 | Zilca et al. | |
| 2010/0049585 A1 | 2/2010 | Mcintyre et al. | |
| 2010/0180029 A1 | 7/2010 | Fourman | |
| 2010/0191737 A1 | 7/2010 | Friedman et al. | |
| 2010/0203876 A1 | 8/2010 | Krishnaswamy | |
| 2011/0016161 A1 | 1/2011 | Loeb | |
| 2011/0055226 A1 | 3/2011 | Martino et al. | |
| 2011/0106942 A1 | 5/2011 | Roskowski et al. | |
| 2011/0173198 A1 | 7/2011 | Malleshaiah et al. | |
| 2011/0276577 A1 | 10/2011 | Yao et al. | |
| 2011/0276689 A1 | 11/2011 | Rosen | |
| 2012/0030210 A1 | 2/2012 | Sankhla et al. | |
| 2012/0072493 A1 | 3/2012 | Muriello et al. | |
| 2012/0078906 A1 | 3/2012 | Anand et al. | |
| 2012/0084088 A1 | 4/2012 | Shaw | |
| 2012/0136861 A1 | 5/2012 | Lee et al. | |
| 2012/0143840 A1 | 6/2012 | Vadon et al. | |
| 2012/0143871 A1 | 6/2012 | Liebald et al. | |
| 2012/0203780 A1 | 8/2012 | Kowalchuck et al. | |
| 2012/0265811 A1 | 10/2012 | Bist | |
| 2012/0310612 A1 | 12/2012 | Martinez et al. | |
| 2012/0310926 A1 | 12/2012 | Gannu et al. | |
| 2012/0330975 A1 | 12/2012 | Lee et al. | |
| 2013/0018982 A1 | 1/2013 | McConnell et al. | |
| 2013/0066634 A1 | 3/2013 | Soliman et al. | |
| 2013/0072169 A1* | 3/2013 | Ross | G16H 40/63 |
| | | | 455/414.1 |
| 2013/0138428 A1* | 5/2013 | Chandramouli | G06F 40/40 |
| | | | 704/9 |
| 2013/0151515 A1 | 6/2013 | Davis et al. | |
| 2013/0185293 A1 | 6/2013 | Boback et al. | |
| 2013/0218991 A1 | 8/2013 | McConnell et al. | |
| 2013/0290340 A1 | 10/2013 | Suermondt et al. | |
| 2013/0290873 A1 | 10/2013 | Rose | |
| 2013/0297694 A1 | 11/2013 | Ghosh | |
| 2013/0325843 A1 | 12/2013 | Aravamudan et al. | |
| 2014/0025620 A1 | 1/2014 | Greenzeiger et al. | |
| 2014/0032517 A1 | 1/2014 | Henderson et al. | |
| 2014/0032596 A1* | 1/2014 | Fish | G09B 7/00 |
| | | | 707/770 |
| 2014/0040365 A1* | 2/2014 | Carter | G06F 16/24578 |
| | | | 709/204 |
| 2014/0074842 A1 | 3/2014 | Tai et al. | |
| 2014/0172837 A1 | 6/2014 | Sommer | |

(56) References Cited

U.S. PATENT DOCUMENTS

| | | |
|---|---|---|
| 2014/0181115 A1 | 6/2014 | Chen et al. |
| 2014/0236953 A1* | 8/2014 | Rapaport ............... G06Q 30/02 707/740 |
| 2014/0297568 A1 | 10/2014 | Beilby et al. |
| 2014/0323817 A1 | 10/2014 | el Kaliouby et al. |
| 2014/0350349 A1 | 11/2014 | Geurts et al. |

OTHER PUBLICATIONS

Lang, Peter J., et al., "Looking at Pictures: Affective, facial, visceral and behavioral reactions", Psychophysiology, vol. 30, © 1993, pp. 261-273.

Picard, Rosalind W., et al., "Toward Machine Emotional Intelligence: Analysis of Affective Physiological State", IEEE Transactions on Pattern Analysis and Machine Intelligence, vol. 23, No. 10, Oct. 2001, pp. 1175-1191.

Kuchinsky, Allan, et al., "FotoFile: A Consumer Multimedia Organization and Retrieval System", CHI '99, Pittsburgh, PA, May 15-20, 1999, pp. 496-503.

Saari, Timo, et al., "Towards Psychological Customization of Information for Individuals and Social Groups", Designing Personalized User Experiences in eCommerce, Kluwer Academic Publishers, the Netherlands, © 2004, pp. 19-37.

Gasson, Mark N., et al. "Normally Mining: Privacy Implications of Behavioral Profiles Drawn From GPS Enabled Phones", IEEE Transactions on Systems, Man, and Cybernetics—Part C: Applications and Reviews, vol. 41, No. 2, Mar. 2011, pp. 251-261.

Turpeinen, Marko, et al., "System Architecture for Psychological Customization of Communication Technology", HICSS 2004, Hawaii Island, USA, Jan. 5-8, 2004, 10 pages.

Hristova, Nataliya, et al., "Ad-me: Wireless Advertising Adapted to the User Location, Device and Emotions", Proc of the 37th Hawaii International Conf on System Sciences, © 2004 IEEE, 10 pages.

Suh, Youngjung, et al., "Context-based User Profile Management for Personalized Services", ubiComp Workshop (ubiPCMM), Tokyo, Japan, Sep. 11-14, 2005, pp. 64-73.

Simoes, Jose, et al., "Chapter 20: Understanding and Predicting Human Behavior for Social Communities", Handbook of Social Network Technologies and Applications, Springer Science+ Business Media, LLC, New York, NY, © 2010, pp. 427-445.

Cho, Myoungsu, et al., "Dynamic Query Interface for Spatial proximity Query with Degree-of-Interest Varied by Distance to Query Point", CHI 2010, Atlanta, GA, Apr. 10-15, 2010, pp. 693-702.

Bereuter, Pia, et al., "The Use of Filters for Adaptive Mobile Mapping Scenarios", AGILE Workshop on Adaptations in Spatial Communication, © 2009, pp. 39-44.

Kosinski, M., Stillwell D., Graepel, T., "Private traits and attributes are predictable from digital records of human behavior," Proceedings of the National Academy of Sciences (PNAS), vol. 110, No. 15, Apr. 9, 2013, pp. 5802-5805.

Youyou, W., Kosinski, M. & Stillwell, D., "Computer-based personality judgments are more accurate than those made by humans," Proceedings of the National Academy of Sciences (PNAS) Early Edition, 2015, pp. 1-5.

* cited by examiner

Email

To: Honey
CC:
Subject: Project

I'm at the office working late tonight. I won't be home until after 9:00 PM.

Facial Image

US 11,663,158 B2

EMPIRICAL DATA GATHERED BY AMBIENT COMPUTER OBSERVATION OF A PERSON ARE ANALYZED TO IDENTIFY AN INSTANCE OF A PARTICULAR BEHAVIOR AND TO RESPOND TO ITS IDENTIFICATION

RELATED APPLICATIONS

This application is a continuation of U.S. patent application Ser. No. 16/800,364, filed on Feb. 25, 2020 (pending), which is a continuation of U.S. patent application Ser. No. 15/411,028, filed on Jan. 20, 2017, issued as U.S. Pat. No. 10,614,029 on Apr. 7, 2020, which is a continuation of U.S. patent application Ser. No. 14/034,231, filed on Sep. 23, 2013, issued as U.S. Pat. No. 9,607,025 on Mar. 28, 2017, which claims priority to U.S. Provisional Patent Application Ser. No. 61/744,394, filed Sep. 24, 2012, which are each commonly assigned and incorporated by reference herein in their entirety.

TECHNICAL FIELD

The present disclosure relates generally to personal profiling and, in particular, in one or more embodiments, the present disclosure relates to multi-component profiling using empirical data gathered from personal digital devices.

BACKGROUND

There are situations in which a true profile of a person could be of immense value to the person himself. Two examples of this would be online dating services and psychotherapy. Once the profile is created, action can be taken based on the profile. For example, a match for a person is suggested by a dating service or a therapeutic solution is given for a psychological problem.

The current approaches to developing a profile of a person involve asking the person questions (i.e., self-report) and/or observing the person interacting with others. These approaches have several problems including the following:
1. The data obtained is unreliable because of both conscious and subconscious biases of the person questioned.
2. The data obtained has the potential for having been skewed because the observer's presence may have affected the observed person's behavior.

For the reasons stated above, and for other reasons stated below which will become apparent to those skilled in the art upon reading and understanding the present specification, there is a need in the art for alternatives to profiling a person.

DETAILED DESCRIPTION

As noted above, existing methods of profiling a person are associated with known problems. For such examples as dating services and psychologists, neither has access to empirical data about the person that has been obtained:
1. without the person biasing it; and
2. in an unobtrusive manner.

That is, they do not have access to uncontaminated data that would let them determine the person's true profile.

Various embodiments provide advantages over prior methods of profiling by using a person's own digital devices to unobtrusively obtain unbiased empirical data about the person, and correlate and analyze this empirical data to obtain a true profile of the person. For example, various embodiments turn a person's digital devices into sensors/collectors that acquire empirical data about the person without self-reporting bias, and thus remove the influence of the observer by having the digital device unobtrusively do the data gathering. Profiles developed by such methods may be referred to herein as a PProfile.

Figure 1:
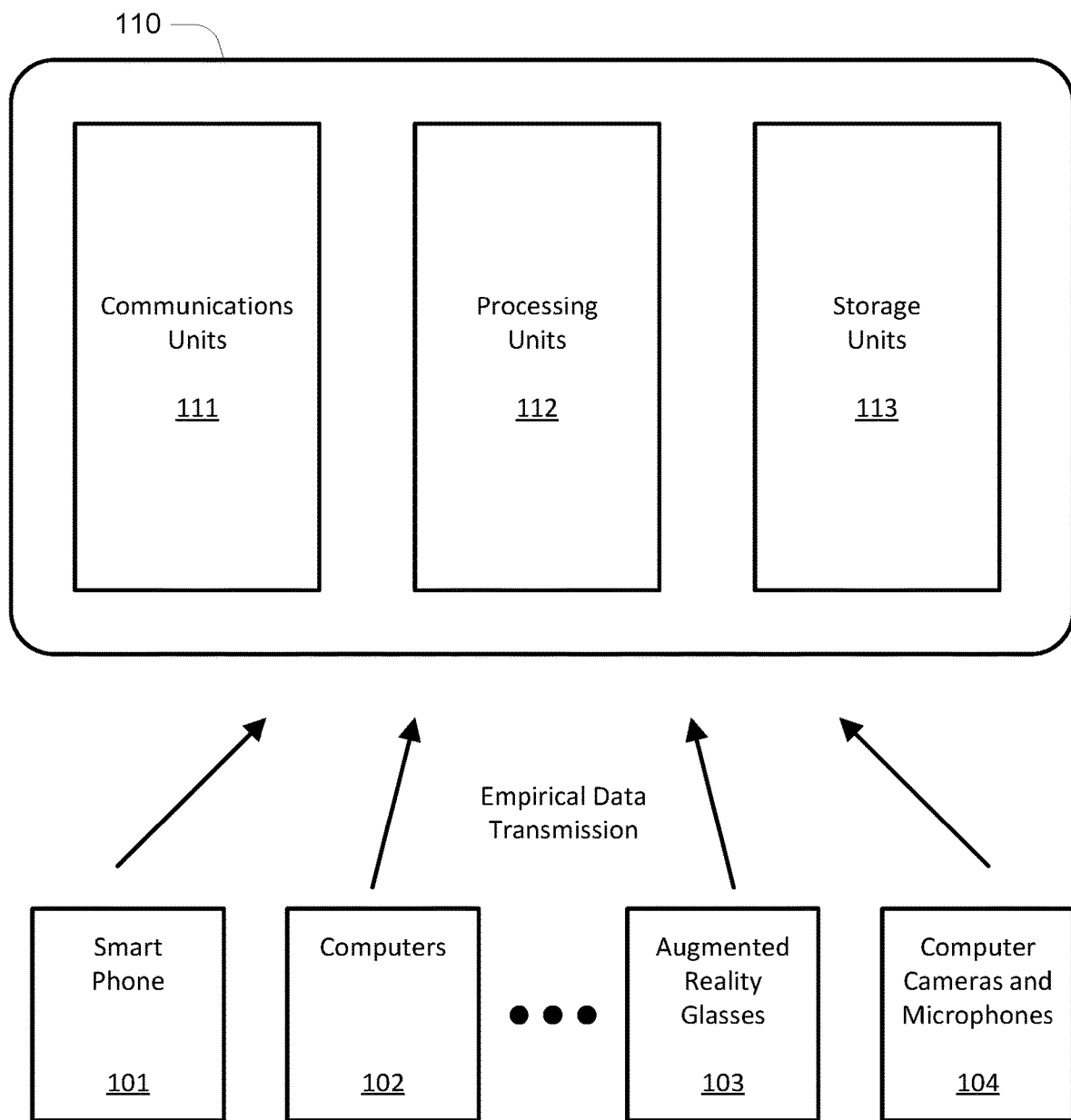
FIG. 1 illustrates a profiling system in accordance with an embodiment.

Some uses for such profiling include:
Online Dating Service, facilitating getting people into healthy, lasting relationships
An aid in psychotherapy and in couples therapy
An aid in self-improvement regimes
To assist physician-patient interaction by identifying health-related behavior patterns
An aid in sentencing or prisoner rehabilitation decisions in a criminal justice system
An aid in sociological research, e.g., using data scrubbed of personal identification information
An aid to career counseling, employee recruitment, student counseling, college selection, college admissions, family counseling, etc.
To enhance a person's credit report
To enhance the function of Networking Parties
An augmented reality approach to interpersonal relationships Various embodiments include profiling systems (e.g., PProfile Systems) including components configured to perform methods described herein. FIG. 1 illustrates a profiling system in accordance with an embodiment. The profiling system includes one or more personal digital devices (PDD). It is expected that including all of a person's PDDs would yield improved results, and may include such PDDs as smart phones, computers (e.g., desktop computer, laptop computer, tablet, etc.), land line phones, TVs, radios, portable media players (e.g., MP3 players), digital wallets, computer-enabled home appliances, digital devices that have been integrated into automobiles and other transportation vehicles, specific-purpose devices (e.g., pedometers, sleep trackers, calorie counters, etc.), augmented reality devices (e.g. GOOGLE GLASS), wearable digital devices, computer cameras and microphones, or any other digital device used by the person or accessed by the person (e.g., point-of-sale systems for credit card use or ATMs). These digital devices can connect to the internet and other networks in a variety of ways including wired and wireless (cellular, RF, IR, etc.), near field communications (NFC), and Wi-Fi.

In the example of FIG. 1, the profiling system (e.g., PProfile System) includes a smart phone 101, computers 102, augmented reality glasses 103 and computer cameras and microphones 104. The profiling system further includes a computer system (e.g., a central computer system or CCS) 110, which includes communications units 111, processing units 112 and storage units 113. Communications units 111 include any and all hardware necessary for communicating between and among the subunits of CCS 110 and between the computer system 110 and the personal digital devices 101-104. The communications units 111 would include, for example, modems, routers, receivers/transmitters of electromagnetic radiation, interface hardware (with appropriate protocol software, e.g., Ethernet), etc. Processing units 112 may include processors (e.g., microprocessors, personal computers, mainframes, etc.) as well as user interface devices (e.g., monitors, keyboards, printers, etc.). Storage units 113 include non-transitory storage media (e.g., semiconductor devices, hard drives, optical discs and drives, tapes and tape libraries, etc.).

Various embodiments further include software (e.g., PProfile System Software), which may include personal digital device (PDD) software and computer system (e.g., Central Computer System or CSS) software. Specific software may be listed as being on specific hardware. This gives one way that the software could be placed. However, other distributions of the PProfile System Software are possible. Consequently, throughout the remainder of this specification, individual software modules can be labeled as PProfile Software—NAME without regard to a particular hardware element.

PDD Software may be placed on each of a person's digital devices. This could be done in at least the following ways:
 by consent of the person.
 by order of a Court.
 by order of a parent for a child's digital devices.
 by order of the Federal Government, e.g., Homeland Security The software placed on a digital device can be a client of software running in the CCS.

Once the PProfile PDD Software is placed on a person's digital device, it may operate without command from the person. It is in this way that the PProfile System may unobtrusively acquire unbiased empirical data about the person. As the empirical data is collected, the PDD Software labels the provenance of the empirical data. For example, the empirical data may be labeled for the PProfile user and for the digital device that captured it.

PDD software can include, for example, the following modules:

PDD Software—Text Content

Software that collects content data (e.g., keywords, XML tags, metadata, addressee, time, duration, subject, complete documents, etc.) from, for example, the following: email, word processor documents, computer contacts lists, tweets, Facebook entries, internet searches, entries into web pages, web pages viewed, chat rooms, text messages, instant messages, digital wallet transactions, etc.

PDD Software—Digital Device Use Monitoring

Software that monitors and documents use of a digital device such as: the amount of time spent using the digital device, the time of day when the use occurred, the geographic location where the use occurred, etc.

PDD Software—Location

Software that collects geographical location data of the device/user such as: GPS data, time at a location, motion of the device while at a location, etc.

PDD Software—App Use Monitoring

Software that monitors and documents the use of software applications (apps). The apps monitored might include, for example, any of the apps available from Apple and Google.

PDD Software—Physiology

Software that monitors and collects data on physiological observables, such as pulse, temperature, keystrokes dynamics, etc.

PDD Software—Surveillance Sensors

Software that turns a digital device's sensors, such as its microphone, camera, and physiological sensors, into surveillance devices. That is, this PDD Software could turn on these sensors independently of instructions from the user of the device.

PDD Software—Surveillance Sensors Data Collection

Software that monitors and collects raw empirical data from the device's sensors. The data collected could include, for example, sound, images, and physiological data.

In addition, some digital devices can be used to collect data in more than one way. Consider digital devices equipped with microphones such as smart phones and computers. Two different types of conversations can be monitored for empirical data using these devices if they have been equipped with PDD Software:
 I. Listening to conversations made through the device, i.e., listening to a call
 II. Listening to conversations held in the presence of the device (i.e., the PDD Software turns the device into a surveillance device that listens to ambient conversations any time that the device is powered on. It may listen to these conversations even when the device is not actively being used to place calls.)

PDD Software—Surveillance Information Extraction

Software that extracts information from the raw empirical data collected by the PDD Software—Surveillance Sensors Data Collection. Some, or all, of this software may be hosted at the CCS. Two examples of the use of this software are given below:
 Empirical sound data of a conversation is collected. This data is then analyzed by voice software and turned into text. The text information is then analyzed by the PDD Software—Text Content and/or the PDD Software—Synopsis.
 Empirical image data is collected. This data is then analyzed to determine if the person's face is in the image.

PDD Software—Local Archiving

Software that archives the empirical data gathered by the individual personal digital devices.

PDD Software—Synopsis

Software that develops a synopsis of the empirical data collected.

PDD Software—Simultaneous Data Collection/Correlation

Figure 2A:
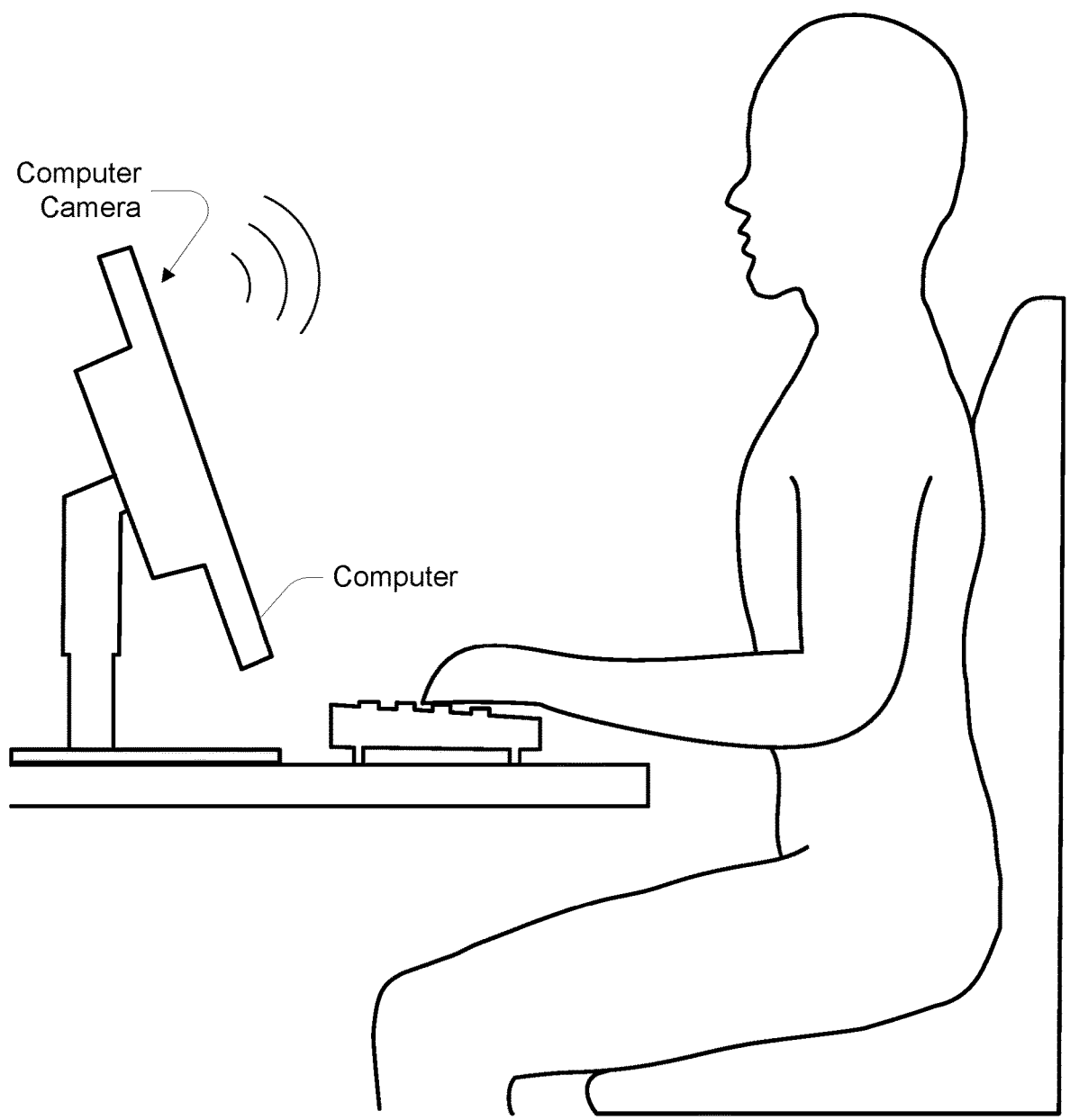
FIG. 2A illustrates a user using a computer having a camera in accordance with an embodiment.
Figures 2B, 2C:
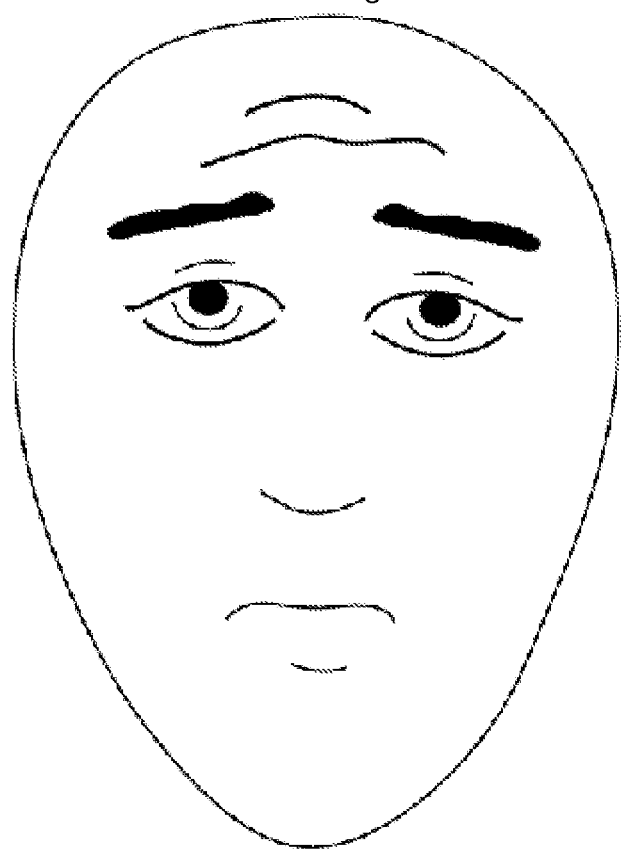
FIG. 2B illustrates user content in accordance with an embodiment.
FIG. 2C illustrates an image of a user's countenance in accordance with an embodiment.

Some digital devices can be used to collect different types of empirical data at the same time. For example, consider computers equipped with word processors, email, internet connection, etc., and with a camera. (See FIG. 2A) At least two types of empirical data can be collected by each of these digital devices using PDD Software:
 content of the word processor, email, website, etc. that the person is working on (FIG. 2B.); and
 images of the user's countenance (FIG. 2C) as he views specific content in the word processor, email, website, etc.

Similarly, a smartphone equipped with PDD Software could be collecting at least the following two types of empirical data:

sound data of a user's conversation; and physiological data about the user during the conversation.

In each case, the two types of empirical data can then be correlated to each other by the either by the PDD Software or by the CCS Software. (See below.)

PDD Software—Identification

Digital Device PProfile Software can also be used to identify the provenance of each instance of gathered empirical data. For example, this software may label the gathered empirical data as originating with a specific person through means such as:

voice identification.

facial recognition.

keystroke recognition.

PDD Software—Transmission

Software that transmits the empirical data that has been collected by the personal digital device to the CCS. This software may also include software that receives PDD Software updates. Note that some digital devices are not connected to the internet. These may instead utilize software that connects the local digital device to, for example, a user's computer that then passes the empirical data to the CCS.

CCS software can include, for example, the following:

CCS Software—Manager

This software manages the entire PProfile System. For example, it manages the data flow that takes raw empirical data and processes it into a user's profile.

CCS Software—Registration

All users of the PProfile System must be registered. This is software that enables a person to register with the PProfile System. This software could, for example, be hosted at a website. In addition, this software can assign an identification number and access codes to the user.

CCS Software—Installation

This software downloads the appropriate PDD Software to the various digital devices of a registered user. It would also enable updates to the PDD Software, and changes that are made as the user's digital devices change.

CCS Software—Control of Surveillance Sensors

This software issues commands to the user's digital device's sensors, such as its microphone, camera, and physiological sensors.

CCS Software—Transmission

This enables the CCS to receive transmissions of data from the personal digital devices of registered users. It also allows the CCS to transmit information to the personal digital devices.

CCS Software—Data Collection

The CCS's Collection Software enables the CCS to collect empirical data gathered by the digital devices and transmitted to the CCS.

CCS Software—Archiving

This is software that maintains an archive. Information archived could, for example, include:

user registration information summary of pertinent facts about the user empirical data gathered from the user's PDDs results of empirical data correlation processes results of analyses of gathered user empirical data behavior data-points scale values for user profile components list of all profile components list of the behaviors associated with each profile component CCS Software—Privacy and Authorization The empirical data collected and the results of the analyses may be strictly private. For such embodiments, the user, and only the user, can authorize the release this information. However, the user would not be provided access to change the empirical data that has been collected by the PProfile System.

In those situations where the user wants parts or all of this information released, the user may follow a set of steps, instantiated through this software, that will authorize which information is to be released and to whom the information is to be released.

Under the PProfile System, access to a user's empirical data and profile might be restricted to the user only. No one else might have access, unless the user authorizes it. In addition, the user could limit third-party authorization to specific elements of his profile. (For example, the user could authorize specified profile elements to be released to a third part. However, the user would not be provided access to change or modify his empirical data or his profile.

CCS Software—Emotion

This software can be hosted on the CCS. However, parts of this software may be hosted on individual digital devices.

The CCS Software—Emotion analyzes certain empirical data and associates an emotion and/or an action with it. "Emotion and/or action" may be collectively referred to as "emotion" in this description. This software could include, for example, the following:

Countenance Software

Countenance Software operates on empirical image data of the user's face collected by the PDD Software. It determines whether the subject's face is present, and if so, determines the user's facial affect. The Countenance Software then associates an emotion with the facial affect. This would include measuring the type and degree of emotional response. Note that the emotional response can then be correlated with a triggering event, e.g., content of an email.

Voice Software

Voice Software operates on empirical sound data collected by the PDD Software on a user's digital device. (See Type I and Type II conversations described above in PDD Software—Surveillance Data Collection.) The Voice Software determines whether it is the subject's voice that is present, and if so, determines vocal affect. The Voice Software then associates an emotion with the user's voice affect. This would include measuring the type and degree of emotional response. In addition, the Voice Software also identifies content in the speech train, if it has not already been done by the PDD Software—Surveillance Information Extraction. The emotional response and the content can then be correlated.

Voice Software can also determine the content of statements made to the person during a conversation. It can then determine the person's emotion (e.g., based on analysis of his voice response) to the content of what he has heard. Note that the emotional response can then be correlated with the statements made to him.

CCS Software—Correlation

This software connects different instances of relevant empirical data to each other. Two examples of this correlation would be:

connecting a person's emotional response to a triggering event, e.g., connecting the contents of an email (triggering event) to happiness (emotional response) at the time the person is reading that email.

connecting a person's behavior at one time to his behavior at another time, e.g., connecting an email that the person has written (behavior at one time) to another email that he has written (behavior at another time.)

CCS Software—INSP List

This software comprises the Instance-Specific (INSP) List of empirical data items. Items in this list could include anything that is a portion of an instance of empirical data such as: words, metadata, physiological data, facial and voice affect, user actions, etc. For each item, the INSP lists an associated family of items. The INSP List is used as part of the correlation process.

CCS Software—Table

The PProfile System can identify, from a user's empirical data, instances of types of behaviors and instances of other observables. "Behaviors" and "other observables" may be collectively referred to as "behaviors" in this description.

The CCS Software—Table lists the identifiable types of behaviors that have been selected by the implementer of the PProfile System; and, for each behavior type, the CCS Software—Table lists the profile components that it pertains to.

CCS Software—Analysis

This software analyzes correlated instances of a user's empirical data for the purpose of identifying instances of particular types of behaviors exhibited by the user. The behavior types that the CCS Software—Analysis can identify are those contained in CCS Software—Table.

CCS Software—Behavior/Component

In this software, each profile component may be linked to a list of behaviors.

CCS Software—Scale Value

This software uses the behavior instances identified from a user's empirical data to determine scale values for the user's profile components. This software can be programmed to update a user's profile scale values from time to time as new behavior instances are gathered.

CCS Software—Profile

This software may include at least the following functions:

lists all the different profile components that PProfile can determine scale values for. This could be archived in compile subsets of profile components to create specialized profiles.

creates, for each user, a profile. It does this by compiling the scale values for each profile component as determined by the CCS Software—Scale Value.

CCS Software—Security and Privacy

The PProfile System may employ any and all available means to protect the security and the privacy of the empirical data being collected and of the derived profile from unauthorized access.

PProfile System could be set up so that the only person authorized to view the empirical data and the resulting profile is the person himself or the person's authorized designee. Various services could be provided to the user for authorized distribution of his empirical data and the resulting profile. While a user can authorize access to his data, the user would not be allowed, by the PProfile System, to change his empirical data or the resulting profile.

There may be software in place that verifies that the person using the digital device is the one that is the registered user of the PProfile Service. For example, facial recognition software, voice recognition software, etc. might be used to verify who is actually using the digital device to mitigate the possibility of collecting irrelevant data.

CCS Software—Specialized Use

Example specialized uses will be described subsequently in this description. The CCS Software—Specialized Use is the software adapted to support such specialized uses.

The following gives some of the types of empirical data that can be collected using a person's digital devices enabled with PProfile Software:

Type of Hardware Used: desktop computer, laptop computer, tablet, smartphone, augmented reality device, etc. and length of time spent using the device.

Type of Use: email, word processor documents, Facebook entries, Tweets, internet searches, GPS, entries into web pages, web pages viewed (URLs), TV (e.g., programs watched—commercial TV, cable, NetFlix, . . . ), etc.

Content (e.g., keywords, XML tags, URL, metadata, complete documents/text, synopses, etc.) of: email, word processor documents, Facebook entries, Tweets, internet searches, GPS, entries into web pages, web pages viewed (URLs), TV (e.g., programs watched—commercial TV, cable, NetFlix, . . . ), etc.

Physiological Data: pulse, temperature, pupil size, keystroke recognition (e.g., typing speed and length of time a key is held down), etc., before, during, and after the conversation.

The person's image (e.g., facial image) while using or being in the presence of the device.

The person's voice while using or being in the presence of the device.

Voice data (e.g., volume, affect, pitch, identity of the speaker, etc.)

Length of time spent on a particular item.

eWallet use (smart phone) and credit card use.

who the conversation is with, content of the conversation (e.g., synopsis, keywords, etc.), complete conversation, time of conversation, duration, location, telephone number, type of conversation (i.e., Types I or II), etc.

geographic location of the user and information on the immediate neighborhood.

physical movement of the user (e.g., walking, running, etc.)

provenance of the empirical data

All of the above may be date and time-stamped.

The following are examples illustrating a process for determining a person's profile. The next section shows the process that these examples illustrate.

A person's profile is comprised of a set of profile elements. Profile elements are also called profile components. Examples of profile components could include the following: honesty, integrity, kindness, loyalty, ambitiousness, happiness, faithfulness, shyness, persistence, adventurousness, cooperativeness, self-control, and uprightness.

One way that a profile can be created from the gathered empirical data is by determining scale values of each of a set of components of the person's profile. For example, the analysis could be accomplished by turning any of the processes listed below into a set of rules which are then organized and implemented in computer software. This software would then become part of the PProfile Software.

The PProfile Process for Determining a Profile of a Person—Examples of General Areas Character Evaluation Any process that deduces the character components of the person's profile from the empirical data gather could be used.

Example 1: Empirical data e.g., facial affect is gathered that documents how a person responds under stress. By then comparing what actually happened (e.g., failure of a project) to the person's response (e.g., he takes responsibility for the failure) conclusions can be drawn about his character. This comparison and conclusion about the person's character can be implemented in software (e.g., using Logical IF statements) and databases in the following way:
 (i) assign values to variables STRESS and RESPONSE based on the empirical data gathered.
 (ii) the IF statement then takes the values of variables STRESS and RESPONSE and compares these to a database.
 (iii) the database correlates different values of the variables STRESS and RESPONSE with scales values of the profile element UPRIGHTNESS.
 (iv) the IF statement finds the database listing that matches the assigned values of STRESS and RESPONSE and then associates the related scaled UPRIGHTNESS element to the person's profile.

Example 2: Empirical data is gathered from two conversations (or emails) that the person has had with two different people on the same topic. By comparing these data, determinations can be made about his honesty and other aspects of his character. This can be implemented in software (e.g., using Logical IF statements) in the PProfile Software. For example, let STATEMENT1 and STATEMENT2 be variables representing what the person has said to two different people about the same topic. The value of these variables can be assigned by the PProfile Voice Software. Then the PProfile Software can compare STATEMENT1 to STATEMENT2. The IF statement then assigns a scaled value to the HONESTY element depending on whether or not the values of the variables STATEMENT1 and STATEMENT2 are consistent with each other.

Behavior—Pattern Determination

Any process that deduces behavior components of the person could be used. For example, through the gathering of empirical data, PProfile can identify and archive how a person responds to specific stimuli. Over time, the software can identify patterns. That is, the software can identify those stimuli that lead to the same response repeatedly. In this way, PProfile identifies conscious and subconscious behavior patterns in the person. As another example, PProfile can identify or deduce tastes, interests, and proclivities of the person. And, based on the total empirical data gathered, PProfile can assign scaled values to each behavior pattern.

Psychological Analysis

Any process that uses logical rules in a data base for assigning probabilistic membership, i.e., scaled values, in categories from the Diagnostic and Statistical Manual (DSM) can be employed as part of the PProfile Analysis.

There are many schools of psychology and of personality testing. Schools of psychotherapy, such as Cognitive Behavioral Therapy, Gottman Institute-type analysis of couples, etc., have rules for assigning scaled values to each of a set of components of the psychological profile of a person or a couple. These rules can be implemented in the PProfile Software. Then, as the PProfile System receives empirical data, it assigns scale values to profile components according to the software-implemented rules.

The PProfile Process for Creating a Profile of a Person—Examples

The following give examples of how the PProfile Process could use the gathered empirical data to develop a profile of a person.

A Person's Activity is Correlated with the Person's Facial Affect
 a. Assume that a person is working at his computer, and accesses a particular website. Empirical data, (e.g., content of the website), is documented by PProfile software. The amount of time that he spends at the website is documented, along with his immediate subsequent actions, (e.g., he does web searches for articles on similar content.)
 b. As he uses a website, facial images of the person are observed by the PProfile PDD Software by using the computer's camera.
 c. The PProfile Software—Emotion deduces the emotional state of the person from his facial images.
 d. The PProfile Software—Correlation correlates the emotional state with the website content.
 e. The PProfile Software—Emotion can then go on to make decisions about the person's profile. For example, the degree and type of emotional reaction (e.g., happiness, bewilderment, anger, amusement, joy, etc.) that a person has when exposed to particular information (e.g., a triggering event such as a web article on the US economy) could be used to determine components of the person's profile. In this example, the conclusion could be drawn that the person is deeply interested in the US economy, but that he is bewildered.
 f. This process is repeated as new empirical data is gathered. Over time, a refined profile of the person emerges through combination of the empirical data and the analysis results from many events.

A Person's Email Composition is Correlated with the Person's Facial Affect
 a. Assume a person is working at his computer, and composes an email. Empirical data, (e.g., content of the emails, date, time, addressee, . . . ), is documented by the PProfile Software.
 b. As the person composes the emails, his facial image is collected by the PProfile Software—Surveillance Sensors Data Collection by using the computer's camera.
 c. The PProfile Software—Emotion deduces the emotional state of the person from his facial images.
 d. The PProfile Software—Analysis can then make deductions about the person's behavior, e.g., he lied in the email about a certain topic.

A Person's Emails are Correlated With Each Other
 a. Assume a person is working at his computer, and composes several emails. Empirical data, (e.g., content of the emails), is documented by the PProfile Software.
 b. PProfile Software—Analysis can compare the emails for consistency. That is, has the person told one person one thing and another person something else on the same topic.
 c. The PProfile Software can then go on to make decisions about the person's profile. For example, any of the following conclusions could be drawn based on the empirical data:
  the person consistently tells email recipients the truth.
  the person selectively tells some email recipients the truth.
  the person lies to all recipients.

A Person's Conversation is Correlated With the Person's Voice and Physiological Data a. Empirical data from conversations (Type I and II) is gathered. This would include: with whom the conversation takes place, content of the conversation, etc.

b. Empirical data related to the person's voice and physiology is gathered: pitch of voice, temperature, pulse, etc.

c. PProfile Software—Emotion can be used to analyze the voice and physiological data to determine the emotional state of the person.

d. The PProfile Software—Analysis can then go on to make decisions about the person's profile by correlating (a), (b), and (c). For example, a particular topic (e.g., lawn care) may illicit a negative emotional response (e.g., anger) from a husband when talking to his wife.

In addition, the PProfile Software can make decisions about the person's profile by correlating (a), (b), and (c) with empirical data from another action by the person. For example, the person may tell someone that he has done a particular thing when, in fact, he has done something else. If this occurs often enough, the PProfile Software can conclude that the person suffers from Pseudologia Fantastica and add this to his profile.

A Person's Actions are Observed and Analyzed a. The person goes to Starbucks. The following empirical data is obtained:
   length of time the person stays in Starbucks.
   percentage of the time that is spent actively using his digital devices.
   digital work that was done using these devices. (For example, does the person spend his time doing web searches related to his work or does he spend his time doing web searches for entertainment.)
   conversations (Type I and II): the duration, the content of the conversations, etc.
   data related to the person's voice and physiology is gathered such as: temperature, pulse, pitch of voice, etc.

b. The PProfile Software correlates and analyzes this data.

c. The analysis of this data could lead to conclusions about, for example, the following:
   the social skills of the person. (For example, is he capable of starting conversations with strangers.)
   the honesty of the person.
   the integrity of the person. (For example, is he looking for a new relationship even though he is married.)
   the vigor and intensity of the person.

A Couple is Observed and Analyzed

PProfile can unobtrusively observe how a couple interacts with each other (e.g., through Type I and II conversations and through changes in their physiology.) This is similar to a couple at a therapist's office except that with PProfile the observer does not affect the observed.

a. Empirical data is gathered on each member of the couple individually. This is done when they are not interacting with each other.

b. Empirical data is gathered on the interaction of the couple. For example, empirical data could be gathered based on their conversations with each other.

c. Empirical data on the physiology of each member of the couple is gathered when they are apart and when they are together.

d. The empirical data is correlated by the PProfile Software—Correlation.

e. This correlated data is then analyzed by the PProfile Software—Analysis. One way to do this is by using the techniques developed at the Gottman Relationship Institute (Seattle, Wash.). The results of this analysis can be used to suggest actions such as: alerting couples to potential problems, behavior modification, separation, divorce, etc.

f. By archiving an individual's empirical data as he functions as a member of a couple, PProfile Software could detect patterns in behavior of the individual. For example, PProfile could see a pattern in which the person is regularly attracted to other people, all of whom have similar profiles.

g. This method could also be used to predict the success of a potential marriage between two single people.

Determining Profile Components From the Empirical Data Gathered—the Process

This section shows the process that the examples, in the prior section, illustrate.

A person's profile is comprised of profile components. Profile components describe different aspects of a person and of the person's behavior. Each profile component might be measured on its own scale, and might have its own characteristic method of determining its scale value.

Different people may have different scale values for the profile components. "Determining the profile of a person" means determining the scale values of the profile components for that person.

The PProfile System determines the profile, for a person, by determining the scale values of profile components using the empirical data gathered by the person's own digital devices.

The PProfile System Process for Determining the Profile of a Person: Preliminaries Profile Components The PProfile System may contain a list of defined profile components. Profile components could include, for example, the following:

honesty, integrity, kindness, loyalty, ambitiousness, happiness, faithfulness, shyness, persistence, adventurousness, cooperativeness, self-control, uprightness, and optimism.

mental disorders listed in the Diagnostic and Statistical Manual of Mental Disorder (DSM) and the Global Assessment of Functioning (GAF).

depth of social network (e.g., in the user's profession or elsewhere), who is in the user's social network, how well the user works with others, is he sought out by his peers for advice, etc.

There are many possible profile components. Each profile component must be defined unambiguously.

Profile Sub-Components and Sub-Subcomponents

The PProfile System may contain a list of defined profile sub-components and sub-subcomponents.

Determining the scale value of a profile component from the empirical data gather is complicated by at least the following problem:

The empirical data is instance-specific; it is not component-specific, i.e., empirical data does not come labeled as being relevant to a particular profile component.

Consequently, the PProfile System must connect instance-specific empirical data to particular profile components.

For some empirical data, this will be easy. For some empirical data, this will be difficult. One method that PProfile could use to make these connections is to define profile sub-components and sub-subcomponents.

For example, consider the profile component "honesty." It broadly covers many situations. However, we can define "spousal honesty" as a subcomponent. We can then go on to define the sub-subcomponent "spousal faithfulness honesty." By defining sub-subcomponents are narrowly as possible, it becomes easier for the PProfile System to identify instance-specific empirical data as being, or not being, relevant to that sub-subcomponent. The process for connecting instance-specific empirical data to a particular profile component is detailed in the following sections.

Since components, subcomponents, sub-subcomponents, and so on, are all components, these will be collectively referred to as components.

Note that there is a fundamental difference between the following two situations:
  (i) Gauging a person's reaction to a movie (i.e., to a controlled stimulus) by observing the person's facial affect (i.e., the person's response) during the movie. The goal of the process is to determine if the person liked the movie. The process does not determine anything about the person. That is, it does not connect the person's response to a component of the person's profile. Nor does it correlate the response with other empirical data; and
  (ii) Determining a person's profile by observing how a person responds to encounters with random (i.e., uncontrolled) stimuli and then associating those responses (i.e. behaviors) with profile components.

A goal of the PProfile process is to assign scale values to profile components. First, observations of self-initiated actions of the person and of reactions of the person to stimuli are used by PProfile to identify instances of particular types of behavior exhibited by the person. PProfile then relates each instance of a particular type of behavior to relevant profile components. Finally, PProfile uses behavior instances in the determination of scale values of the relevant profile components.

A goal of PProfile is to determine a person's profile, i.e., assign scale values to his profile components. It is not to just measure a person's reaction to a controlled stimulus.

Identifiable Types of Behaviors and Profile Components

The CCS Software—Table lists the types of behaviors that the PProfile system can identify from a user's empirical data; and, for each behavior type, the CCS Software—Table lists the profile components that it pertains to. As an example, consider the behavior type "lying." The CCS Software—Table could contain the following entry:
  Identifiable Type of Behavior: Lying
  Profile Components Behavior Pertains To:
  Honesty
  Integrity
  Responsibility
  Courage
Other behaviors may list other pertinent profile components. There can be overlap between the lists of pertinent components for different behavior types.

In operation, if an instance of a particular type of behavior is identified in a user's empirical data, then the PProfile System searches the CCS Software—Table to find the list of profile components that the identified behavior pertains to.

The CCS Software—Table could also be arranged based on the profile components. As an example, consider the profile component "honesty." The CCS Software—Table could contain the following table entry:

Profile Component: Honesty
  Identifiable Types Of Behaviors Pertinent To Honesty:
  Virtuous
  Lying
  Cheating
  Stealing
Other profile components may list other types of behaviors. There can be overlap between the lists of types of behaviors for different profile components.

Instance-Specific Empirical Data Items

One of the tools employed by PProfile, in determining a user's profile, is to correlate different instances of a user's empirical data that are relevant to each other (e.g., relevant vis-à-vis a behavior or a profile component). Once identified, these correlated instances of a user's empirical data may be analyzed, as a collection, as part of the process determining the user's profile.

Consequently, the PProfile System must be able to correlate an instance of a user's empirical data (labeled $ED_X$) to other instances of a user's empirical data (labeled as $ED_M$) that are relevant to it. However, correlation may be complicated by at least the following problem: The empirical data is instance-specific; empirical data does not come labeled as being relevant to other instance-specific empirical data.

For some empirical data, this correlation is easy. For other empirical data this correlation is hard. One method that PProfile could use to accomplish this correlation would be to develop an Instance-Specific (INSP) List of empirical data items.

Figure 3:
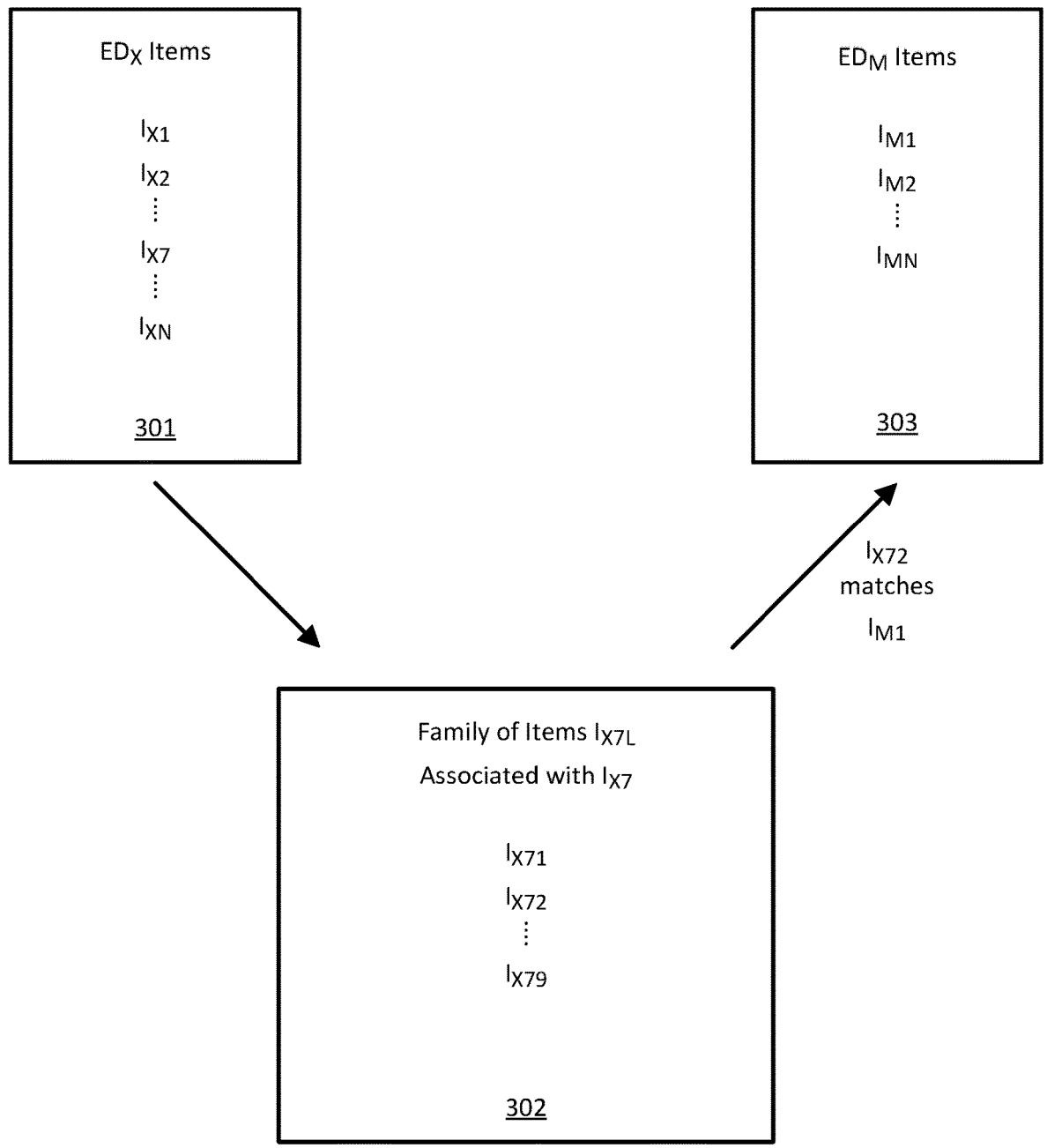
FIG. 3 illustrates correlation of instances of empirical data in accordance with an embodiment.
Figure 4A:
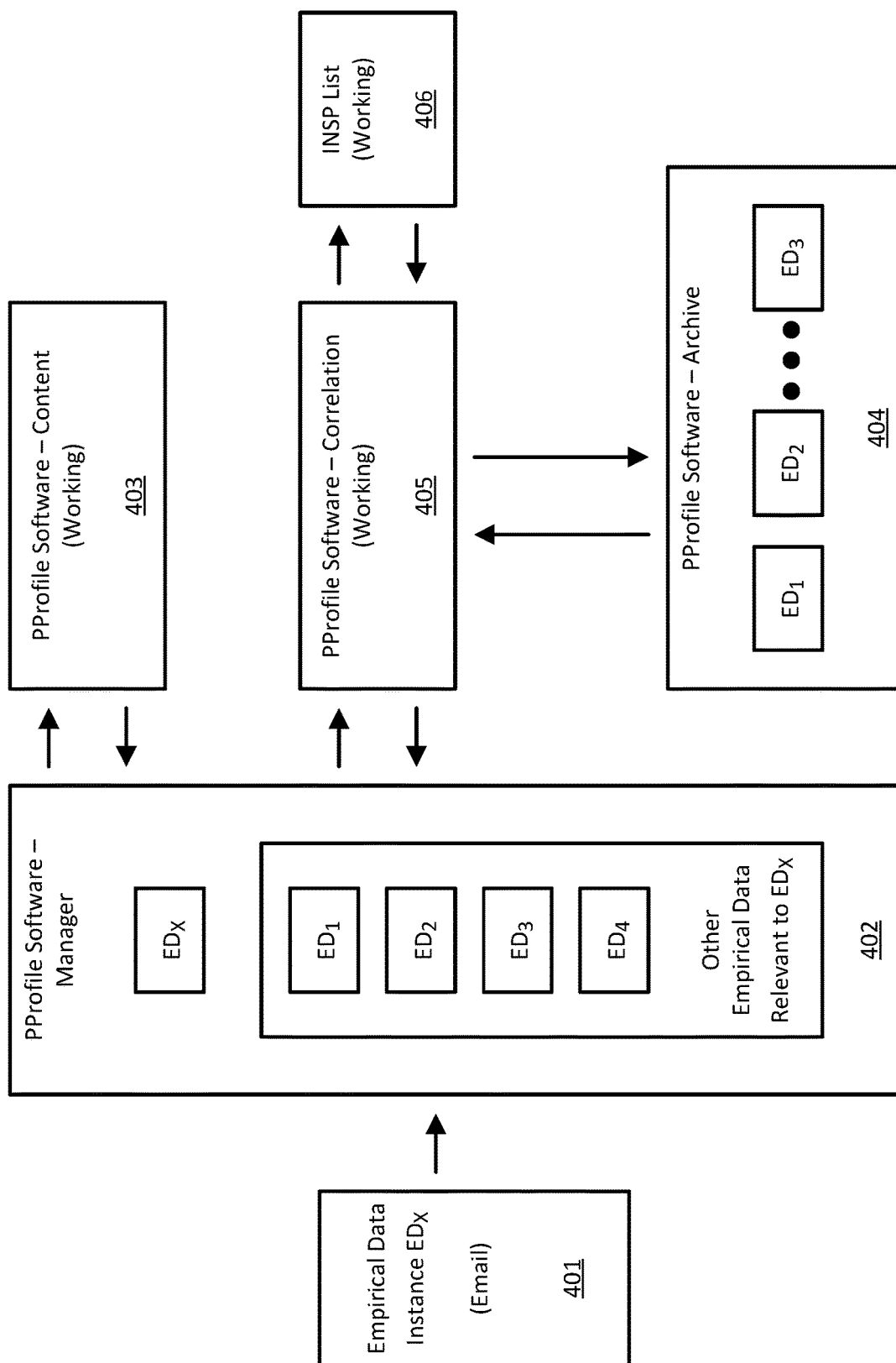
FIG. 4A illustrates correlation of instances of empirical data in accordance with a further embodiment.

Developing an INSP List of items will be done in this section. (See below and FIG. 3) The next sections show how the INSP List could be employed within the PProfile System for correlating different instances of empirical data. (See FIG. 4A)

To see how an INSP List would be developed, consider $I_{XN}$ (where N is an integer) as an item that would be a portion of the instance of empirical data $ED_X$ (301). The item $I_{XN}$ could include, for example, any of the following: words, metadata, physiological data, facial and voice affect, user actions, etc.

A goal of PProfile would be to correlate $ED_X$ with other, relevant instances of empirical data $ED_M$ (where M is an integer.) To accomplish this, develop a family of items (302), $I_{XNL}$ (where L is an integer), to be associated with the item $I_{XN}$. All the items $I_{XNL}$ in this family are, in some way, related to the item $I_{XN}$. Consequently, if an item, $I_{XNL}$, in this family matches an item (303), $I_{MN}$ (N is an integer) associated with another instance of empirical data ($ED_M$), then it would be an indication that the other instance of empirical data, $ED_M$, is relevant to $ED_X$. Once the family of items is developed, include it in the INSP List associated with the item $I_{XN}$. See FIG. 3 where the particular item $I_{X7}$ is used as a specific example. The family of items associated with $I_{X7}$ is labeled $I_{X7L}$ (where L is an integer.) In this example, assume that $I_{X72}$ matches $I_{M1}$. This match indicates that $ED_M$ is relevant to $ED_X$. So, $ED_M$ will be correlated to $ED_X$ in the correlation process.

The INSP List includes many individual items $I_{XN}$. Specific items $I_{XN}$ are denoted with specific values of X and N, with X and N being integers, and each item $I_{XN}$ will be linked to a family of related items $I_{XNL}$. Families of related items $I_{XNL}$ for different items $I_{XN}$ could overlap.

This process could be extended in the following way. Consider that the instance of empirical data $ED_M$ as containing items $I_{MN}$. For each $I_{MN}$, develop a list of associated items $I_{MNL}$. Then, to determine if $ED_M$ is relevant to $ED_X$, look for matches between any member of the family ($I_{XNL}$) associated with $I_{XN}$, and any member of the family ($I_{MNL}$) associated with $I_{MN}$.

As a specific example, consider the instance empirical data $ED_X$ to be an email. And, consider the item, $I_{XN}$, associated with $ED_X$ to be the word "working" that appears in the body of the email.

The items associated with "working" would include, for example, the following: words, metadata, physiological data, facial and voice affect, user actions, etc.

For the item "working", the associated family of items, $I_{XNL}$, in the INSP might include:
- words (e.g., work, late, overtime, deadline, project, evening, time of work, finish, meeting, dinner, drink, occupation, job, boss, supervisor, gig, etc.)
- spouse's name
- supervisor's name
- employer's name
- time-period around the time that the email was composed and/or sent ($TP_1$)
- time-period during which "working" occurs ($TP_2$)
- time-stamped empirical data such as: emails, phone calls, location, etc. Any empirical data that is time stamped as being within $TP_1$ or $TP_2$
- physical location where email was composed
- physical location of work place
- physical location of the user during the "working" time-period.
- facial affect
- voice affect
- physiological data A Process for Correlating Instances of Empirical Data The following describes a PProfile process for correlating instances of empirical data. (See FIG. 4A)

Correlation Process Steps:

The PProfile System gathers an instance of user empirical data (labeled $ED_X$ in 401) and transmits it to the PProfile CCS and the PProfile Software—Manager (402).

As an example, assume that the instance empirical data is a particular email that a user is sending. When $ED_X$ is an email, the empirical data gathered could include the following: content, addressee, time of sending, provenance of the empirical data, etc. All of these, taken together, constitute the instance empirical data $ED_X$.

Some of the data collected might include the following:
From: PProfile User
To: User's Wife
Date Aug. 30, 2012, 4:12 PM EDT
Body: "I'm at the office working late tonight. I won't be home until after 9:00 PM."

The PProfile Software—Manager passes $ED_X$ on to the PProfile Software—Content (403) and archives $ED_X$ on the PProfile Software—Archive (404).

The PProfile Software—Content analyzes the instance empirical data $ED_X$.

In the above example, the PProfile Software—Content analysis would identify the word "working," in the body of the email, as an item that is a portion of the instance of user empirical data. The PProfile Software—Content labels the results of its analysis as being for $ED_X$ and passes the results back to the PProfile Software—Manager. The PProfile Software—Manager archives the analysis results obtained from the PProfile Software—Content in the PProfile Software—Archive (404). The PProfile Software—Manager passes the analysis results obtained from the PProfile Software—Content on to the PProfile Software—Correlation (405).

The PProfile Software—Correlation (405) may execute the following steps when it receives the results of the analysis of the instance empirical data:

(i) Search the INSP List (406) to find matches to the instance empirical data results, e.g., search the INSP for the word "working." If a match is found in the INSP, then there will be an family of items that are associated with the instance empirical data results, e.g., there will be a family of items associated with the word "working." See above for an example of a family of items associated with the word "working."

(ii) Using the family/families of items found in the INSP List that are associated with the instance of user empirical data, search the PProfile Software—Archive (404) for other instances of the user's empirical data that contain matches to items in the family/families of items associated with the instance empirical data, i.e., look for instances of user empirical data ($ED_M$) that are relevant to the instance of user empirical data ($ED_X$). (See FIG. 3) For example, search the archived user empirical data looking for matches to the items in the family of items in the INSP List associated with the word "working." The word "drink" is in the family of items associated with the word "working" in the INSP List. (See above.) So, the PProfile Software—Correlation would look for other instances of user empirical data that contain the word "drink."

In addition, the search routine executed by the PProfile Software—Correlation can be customized to search for such things as:
- specific empirical data that, by definition, is relevant, e.g., facial affect while composing the email.
- physical location of the user during the time period that he is supposed to be working.
- empirical data time-stamped as having occurred during a specified time period before and/or after the instance empirical data $ED_X$.

Finally, the PProfile Software—Correlation can be programmed to stop searches related to the $ED_X$ when certain conditions are meet, such as, amount of time spent searching, number of results, number of searches done, etc.

The following are examples of "other instances of empirical data" ($ED_M$) that the PProfileSoftware—Correlation searches of the PProfile Software—Archive could find that are relevant to the example instance of empirical data $ED_X$ given above:

$ED_1$: User's Facial Image While Writing An Email To His Wife The PProfileSoftware—Correlation found the facial-image empirical data that PProfile gathered during the time-period ($TP_1$) that the user was writing the instance email $ED_X$.

$ED_2$: Physical Location Of The User During The "Working" Time Period The user has told his wife that he will be working and will not be home until after 9:00 PM. Consequently, the physical location of the user during that time period ($TP_2$) is relevant empirical data. The PProfileSoftware—Correlation searches the Empirical Data Archive looking for instances of empirical data that allows for the determination of the physical location of the user during the time period from 5:00 PM to 9:00 PM. The PProfileSoftware—Correlation finds location information as gathered by the user's smartphone.

$ED_3$: Time-Stamped Empirical Data The PProfileSoftware—Correlation searches for time-stamped empirical data. That is, PProfileSoftware—Correlation has received the empirical data $ED_X$. $ED_X$ contains the time that the instance-empirical data $ED_X$ was created by the user. It then searches for user empirical data that is time-stamped during a specified period ($TP_1$) before and after the time of the instance empirical data $ED_X$. For example, the PProfileSoftware—Correlation finds a phone call received in the specified time period $TP_1$ before the instance email $ED_X$.

$ED_4$: Matches To Items In The INSP List Associated With The Word "Working"

The PProfileSoftware—Correlation finds an email sent by the user containing the word "drink", i.e., containing an item in the family of items associated with the word "working."

The PProfileSoftware—Correlation (405) labels any the matches ($ED_M$) that it found as correlated, i.e., potentially relevant, to the instance empirical data $ED_X$. PProfileSoftware—Correlation then archives the results in PProfile Software—Archive (404).

The PProfileSoftware—Correlation passes its results back to the PProfile Software—Manager.

Analysis

The PProfile Software—Correlation passes any matches to "other empirical data" it has found back to the PProfile Software—Manager. These matches are other instances of empirical data ($ED_M$) potentially relevant to $ED_X$.

The PProfile Software—Manager receives the matches and passes them on to the PProfileSoftware—Analysis. The PProfileSoftware—Analysis uses these correlated instances of user empirical data, $ED_X$ and $ED_M$, for the purpose of identifying instances of particular types of behaviors exhibited by the user. The behavior types that the PProfile Software —Analysis can identify are those contained in CCS Software—Table (see above).

To see how the analysis process would work, consider the specific examples of instance empirical data $ED_X$ and possible relevant empirical data $ED_1$, $ED_2$, $ED_3$, and $ED_4$ given above.

The instance empirical data, $ED_X$, included an email comprised of the following information:

From: PProfile User
To: User's Wife
Date: Aug. 30, 2012, 4:12 PM EDT
Body: "I'm at the office working late tonight. I won't be home until after 9:00 PM."

The following are examples of the PProfile analysis using the instance empirical data $ED_X$ and relevant empirical data $ED_1$, $ED_2$, $ED_3$, and $ED_4$:

$ED_1$: User's Facial Image While Writing ($TP_1$) An Email To His Wife

Analysis: The PProfileSoftware—Analysis passes $ED_1$ onto the PProfile Software—Emotion/Countenance. The Emotion/Countenance software determines whether the subject's face is present, and if so, determines the user's facial affect. The Emotion/Countenance software then uses the facial affect to make a determination about the user. Note that the analysis done by the PProfile Software—Emotion/Countenance could have been done when the $ED_1$ data was first gathered. For the case of $ED_1$, the Emotion/Countenance software determines that the user was lying. The PProfile Software—Emotion/Countenance then passes this result back to the PProfile Software—Analysis. The PProfileSoftware—Analysis then connects the results of the PProfile Software—Emotion/Countenance analysis of $ED_1$, to the instance empirical data $ED_X$. By making this connection, PProfileSoftware—Analysis is able to identify an instance of a particular type of behavior exhibited by the user.

Type of Behavior Identified: The user lied to his wife about working late at the office.

$ED_2$: Physical Location Of The User During The "Working" Time Period

Analysis: In the instance empirical data $ED_X$, the user states that he will be "at the office working late tonight." The PProfileSoftware—Analysis searches the PProfile Software—Archive and obtains the physical location of the user's office. Alternatively, this could be done by the PProfile Software—Correlation. The PProfileSoftware—Analysis then uses $ED_2$ to obtain the actual physical location of the user during the "working late" time period ($TP_2$). PProfileSoftware—Analysis then compares the archived physical location of the user's office with the actual location of the user during the time period when he told his wife that he would be working late. For the case of $ED_2$, PProfileSoftware—Analysis finds that the user's actual location is not at his office. PProfileSoftware—Analysis is then able to identify an instance of a particular type of behavior exhibited by the user.

Type of Behavior Identified: The user lied to his wife about being at the office working late.

$ED_3$: Time-Stamped Empirical Data

Analysis: PProfileSoftware—Analysis has received $ED_3$ from the PProfileSoftware—Manager. $ED_3$ comprises a phone call received by the user during the time period $TP_1$. PProfileSoftware—Analysis passes $ED_3$ onto the PProfile Software modules Voice and Content. These PProfile software modules determine the following:

Call From: Woman's Name
Date: Aug. 30, 2012, 4:05 PM EDT
Content: "I'll meet you for a drink at 7 PM."

Note that the analysis done by the PProfile Software modules Voice and Content could have been done when the $ED_3$ data was first gathered. This information is then passed back to PProfileSoftware—Analysis. The PProfileSoftware—Analysis then compares the above information with the information in $ED_X$. The results of this comparison allows PProfileSoftware—Analysis to identify an instance of a type behavior exhibited by the user.

Type of Behavior Identified: The user lied to his wife about being at the office working late.

$ED_4$: Matches To Items In The INSP List Associated With The Word "Working"

Analysis: PProfileSoftware—Analysis has received an email ($ED_4$) from the PProfileSoftware—Manager. The email contains the following information:

From: Woman's Name
To: User
Date: Aug. 30, 2012, 4:05 PM EDT
Body: "I'll meet you for a drink at 7 PM."

$ED_4$ is relevant because the body of the email contains the word "drink," i.e., it contains a word that appears in the family of items associated with the word "working" in the INSP List. The PProfileSoftware—Analysis compares the two emails and is able to identify an instance of a particular type of behavior exhibited by the user.

Type of Behavior Identified: The user lied to his wife about working late in the office.

Note that, in each example, PProfileSoftware—Analysis has identified an instance of a particular type of behavior exhibited by the user. This identification has been achieved by analyzing correlated instances of the user's empirical data.

Determine Behavior Data-Points

When empirical data is gathered it is raw empirical data. As described in the sections above, some analysis must be done to determine, for example:

Content of Instance Empirical Data
Emotion associated with a facial affect
Correlated empirical data
Behavior Identified: Analysis of the instance empirical data and relevant other empirical data leads to the identification of an instance of a particular type of behavior exhibited by the user.

Once this initial analysis is completed on the raw empirical data, the result is termed an "instance of a particular type of behavior exhibited by the user" or, equivalently, a "behavior data-point" or BDP.

Each of the following is an example of a behavior data-point:

Example A—The combination of:
empirical data: content of email from husband to wife
correlated empirical data: facial affect
type of behavior identified: husband was lying while writing the email to wife Example B—The combination of:
empirical data: content of email from husband to wife
correlated empirical data: content of email from husband to girl friend
type of behavior identified: inconsistency between these two emails shows that husband has lied to wife Example C—The combination of:
empirical data: content of email from husband to wife on project results
correlated empirical data: facial affect shows stress
correlated empirical data: email in which husband takes responsibility
type of behavior identified: husband exhibits the behavior of uprightness.

As a BDP is identified by the PProfileSoftware—Analysis, it is labeled with the user's identification, or with some other information to link it to the user, and then it is passed to the PProfile Software—Manager.

Connecting a Behavior Data-Point (BDP) to a Profile Component

Figure 4B:
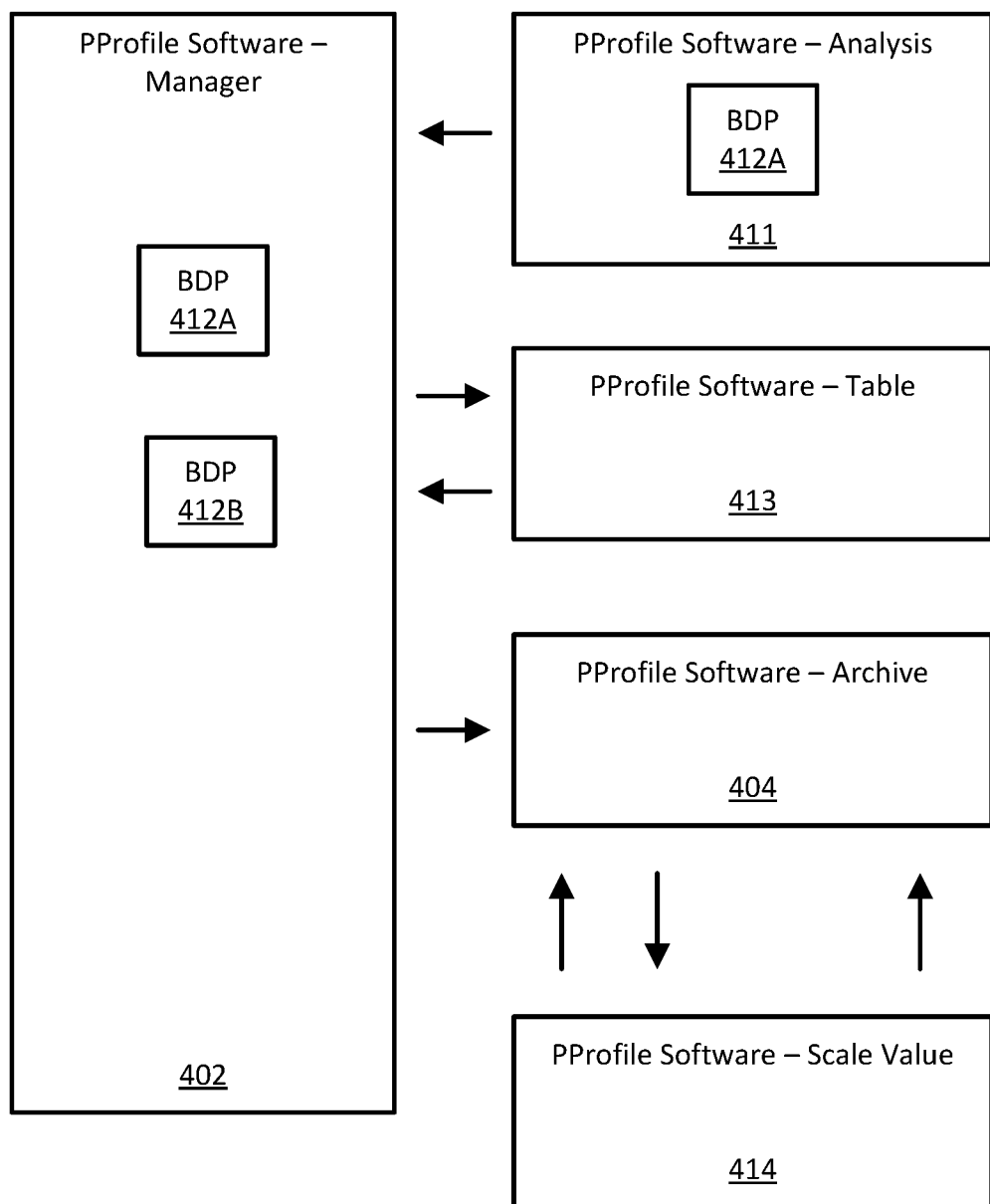
FIG. 4B illustrates connecting a behavior data-point to a profile component in accordance with an embodiment.

This section shows the process for connecting a behavior data-point (BDP) to a profile component. (See FIG. 4B)

The PProfile Software—Manager (402) receives a BDP (412A) from the PProfile Software—Analysis (411).

The PProfile Software—Manager locates the type of behavior identified in the BDP. The PProfile Software—Manager uses the type of behavior identified in the BDP to search the PProfile Software—Table (413) for the profile component(s) (PC) that the BDP (412A) pertains to.

The PProfile Software—Manager adds the results of this search to the BDP (412B).

The PProfile Software—Manager archives the BDP (412B) in the PProfile Software—Archive (404).

Determine Scale Values of Profile Components

A goal for the PProfile System is to determine the profile of a user. "To determine the profile of a user" means to determine a scale value for each profile component for the user. A scale value of a profile component is determined as the result of analysis of the user's behavior data-points which are pertinent to that profile component.

Each profile component may be measured on its own scale and may have its own characteristic method of determining its scale value. For example, the profile components happiness and honesty may be measured on different scales.

The crucial conditions that each profile-component scale should satisfy include at least the following:

The scale should be explicitly and unambiguously defined.
The scale should have reliability and validity.
The scale should be consistently applied to all users.

For each profile component, many potentially usable scales exist in the literature. Consequently, for any particular implementation of the PProfile System, one of these scales may be chosen for each component.

This section shows the process for determining scale values for a profile component. (See FIG. 4B)

The PProfile Software—Scale Value (414) contains the scale for each profile component. It also contains the algorithms for determining a scale value, for each component, by using the behavior data-points (BDP) pertinent to each respective component. The PProfile Software—Scale Value (414) can be set to execute at specific time intervals or can be triggered to execute by an event such as receiving a command from the PProfile Software—Manager (402) when the Manager receives a new BDP (412B).

Process For Determining The Scale Value Of A Component For A User:

The PProfile Software—Scale Value (414) executes a search of the PProfile Software—Archive (404) to find all the BDPs (412B) that pertain to a given profile component.

The PProfile Software—Scale Value (414) collects all the BDPs (412B) that pertain to the given profile component and then executes the appropriate algorithm for the scale for the given profile component. The result of the algorithm is the scale value for the given profile component. The PProfile Software—Scale Value (414) then labels this scale value as being for the particular user.

The PProfile Software—Scale Value (414) archives the scale value for the given profile component in the PProfile Software—Archive (404).

The PProfile Software—Scale Value (414) repeats the above steps for each profile component of the user.

Create A Profile

A profile is comprised of a set of components. As time goes on, a user's profile will become more complete in that the empirical data gathered with be related to a larger variety of components. And, the profile will become more accurate, since it will be based on more data-points for each component.

The PProfile System Process for Determining the Profile of a Person: Steps

A particular embodiment according to the present invention is now described by which the PProfile System determines a person's profile. Other embodiments are possible.

The PProfile Process comprises the following steps:
gathering instances of empirical data by using the person's digital devices as collectors of digital data;
collecting the instances of a person's empirical data;
archiving the instances of the person's empirical data;
correlating relevant instances of the person's empirical data;
identifying an instance of a particular type of behavior exhibited by the person by analyzing correlated instances of empirical data;

labeling the correlated instance of empirical data and the identified instance of a particular type of behavior as a "behavior data-point" for the person;

searching a table to find the profile components that the particular type of behavior, of the behavior data-point, are pertinent to;

adding the pertinent profile components to the behavior data-point;

archiving the behavior data-point in an archive;

for a specified profile component, searching the archive for all those behavior data-points, of the person, that are pertinent to the specified profile component;

assigning a scale value to the specified profile component, of the person, by analyzing all the archived behavior data-points, of the person, pertinent to the specified profile component;

repeating the process for each profile component;

creating a profile for the person by collecting the scale-valued profile components;

repeating the process as additional empirical data is gathered to update the profile.

Specialized Uses of the PProfile System

The following are examples of how a person's profile and the PProfile System could be used.

PProfile Online Dating Service a. Empirical data about a person is gathered and correlated by PProfile Software.

b. The empirical data is analyzed by the PProfile Analysis Software. This results in a profile for the person.

c. The above steps are repeated for all the men and women using the PProfile System Online Dating Service.

d. The PProfile System Online Dating Service suggests matches between people with complementary profiles. One way to do this is by using the techniques developed at the Gottman Institute (Seattle, Wash.)

Psychotherapy a. Empirical data about a person is gathered and correlated by PProfile Software.

b. The empirical data is analyzed by the PProfile Analysis Software. This results in a profile for the person.

c. The person can then share the empirical data and the profile with a therapist. The therapist is then in a much better position to understand the person and suggest therapy for the person.

Couples Therapy a. Empirical data is gathered on each member of the couple. This is done when they are not interacting with each other. And, it is done when they are interacting with each other.

b. The empirical data is correlated by the PProfile Software and is analyzed by the PProfile Analysis Software. One way to do this is by using the techniques developed at the Gottman Institute (Seattle, Wash.)

c. The results of this analysis can be used to suggest actions such as: alerting couples to potential problems, behavior modification, separation, divorce, etc.

Self-Improvement a. Empirical data about a person is gathered and correlated by PProfile Software.

b. The empirical data is analyzed by the PProfile Analysis Software. This results in a profile for the person.

c. The person can then use this information to do, for example, any of the following:

Develop good habits

Break bad habits. To break a bad habit, a person must become aware that he has the habit and must realize that it is doing him harm. PProfile can help on both of these points.

Identify patterns of behavior he was unaware of

Apply techniques such as those from "Personal Power" (Anthony Robbins). For example, using head-mounted display devices, messages could be sent to the person in real-time that will help to implement Personal Power techniques such as Neuro-Associative Conditioning Systems (NACS).

Health Care

The person's profile can become part of the person's medical records.

The person's physician can be given his profile as a way for the physician to better understand the psychological make-up of the person. The profile would supplement the conclusions the physician draws about the patient from their direct interactions.

The PProfile System could also be used to assist physicians in identifying behaviors and habits (both conscious and subconscious) that the patient has. Some behaviors/habits lead to or are indicators of illness. The PProfile System could also be used to monitor whether or not the patient is following some prescribed procedure.

Real Time Feed Back. These are not just periodic "support statements" Rather, these are tailored messages that are a response to what the person is doing as observed by PProfile.

The Criminal Justice System

A person's profile could be used, for example, in the Sentencing stage of the Justice System. The profile would give the Judge a much better understanding of the person and how believable his statements of remorse are.

A person's profile could be used, for example, in helping to determine a rehabilitation program for a prisoner.

A person's profile could be used as a means of preventing crimes. For example, certain behavior could trigger a response of getting the person into a mental health clinic.

Sociological Studies

Compilations of many profiles, each of which has been scrubbed of personal identification data, could be used by sociologists for a broad host of studies, such as: identifying new groups of people and behavior, discovering tendencies that are a function of geographical location, etc.

Government Census

Compilations of many profiles, scrubbed of personal identification data, could be used by governments to identify patterns in the general population. For example, a study recently reported that Wall Street has a much higher percentage of psychopaths than does the population as a whole. This type of study would greatly benefit from having the PProfile System scrubbed-data available.

Career Counseling

The PProfile System could match a person to particular careers by using his profile. That is, careers filter out certain personality types. PProfile can be used to ascertain if a person is suitable for a particular type of career based on his profile.

Employee Recruitment and/or Screening

Private, government, and military employers may request access to a person's PProfile Account to, for example, assess the person's suitability for the job (i.e., the person's PProfile System profile becomes part of the person's resume.)

find ways to improve an employee's productivity assess the suitability of a person to work on a particular project or to work with a particular group (i.e., does the employee's profile mesh with that of the other team members.)

Student Counseling

A student's profile could be given to a school counselor as a means of helping to understand why the student may be having problems. The profile could also be used to anticipate problems and take preventative action.

School Administrators

Schools administrators could use student profiles as a means of getting the mix of students that the administrators want in a class.

Choosing a School or College

A student could be matched to a college based partly on how his profile matches any of the following:

the requirements of the college how students, with similar profiles, have done at the school or college in past years. (A school is only a "good school," if it is good for the student. The PProfile System would give a way of quantifying "good.")

how well the student's profile fits with that of the general student body.

College Selection of Entering Students

An student's Profile could be required as part of the student's Application for Admission. The college could be looking for students with certain profiles or for a student body with a particular mix of profiles.

Family Counseling: Profiles Of Both Parents And Children

A child's profile could be given to the parents as a way of helping the parents to better understand the child. This use of the PProfile System holds the interesting possibility of correlating a child's profile with a parent's profile in Family Counseling.

Parents and Teenagers

Teenager comes home, eats, and closes the door to his room. PProfile gives the parent a way of knowing not only what the teenager is doing by why, i.e., his psychological motives, etc. PProfile gives the parent information that he has never had before.

Real Estate

One of the variables that goes into buying a home is the school district that it is in. Parents often choose a house based on the school district that it is in. PProfile could be used by parents to assist in home purchases, i.e., a good school is only good if it is good for your child.

Sports

In world class sports, what typically makes the difference between athletes is not physical ability but rather mental/emotional state. An athlete's profile gives his coaches a deeper understanding of the athlete than they may have. This could be used by his coaches to get the athlete to perform at the optimum level.

PProfileCreditReport

The person's PProfile System profile becomes part of the person's credit report.

Homeland Security

Homeland Security could use the PProfile System as a way of identifying potentially dangerous people. In antiterrorism efforts, often times suspects are dropped from surveillance because there is not enough manpower to watch them. PProfile could help with this problem.

Networking

Networking parties bring people together to establish, for example, business relations. One of the problems with these is that, in large gatherings, it is hard to be efficient in meeting the right people for your needs. These parties would be greatly aided by PProfilePublic as described below. By employing PProfilePublic a person could walk into a room with 200 people and could efficiently be matched with the people that meet his criteria.

PProfileSportsDrafting

Professional sports teams spend large sums of money trying to figure out who the right draft picks are for them. This effort is increasingly data-driven. However, according to an Apr. 25, 2013 article in American Public Media's Marketplace Tech Report:

"Even if you know everything there is to know about a player like Jahleel Addae—tackles, sacks, kick returns, and interceptions—what you don't know, what you can't know, is how he will fit in with the rest of the team."

PProfile could know. Or, at least, could help to know which players would fit in with the rest of the team.

This could be done by having all the players on the team and the potential draftees enroll as clients of PProfile. Once PProfile develops profiles for them, these can then be analyzed to see if a potential draftee fits in with the rest of the team.

PProfilePolling

One of the difficult things about polls and surveys is finding a group that is truly representative of a larger population. PProfile could be of great assistance in doing this. Given a group of people who are all members of PProfile, PProfile could pick out a smaller, selected group based on criteria set by the polling organization.

PProfile could also be used in another way. Imagine that the polling organization is presented with a sampling group. That is, it cannot pick the group. If the members of the group were PProfile users, then PProfile could provide the polling organization with the profile of each member of the group, with the authorization of the members. That is, PProfile knows the audience. The polling organization can then interpret the meaning of the poll results relative to the group that it has.

In addition, PProfile could provide relevant empirical data that has not been available before, such as:

Conversations and emails related to the poll material of the members of a sampling group.

Some polls are being used to evaluate things such as movies and commercials. For example, the facial affect of a person is registered as they watch a movie or a commercial. However, the facial affect is, to a degree, out of context. PProfile would allow the polling agency to put the facial affect into the context of the person, i.e., PProfile knows the audience PProfileGunPermit Background Checks Background checks for gun permits have strict regulations that must be met. PProfile could have a background check done before the person even thinks about buying a gun. PProfile could do this by keeping a running check going on all empirical data gathered on the person.

In addition, PProfile could add a new dimension to Background Checks. For example, PProfile could flag those people who are prone to spontaneous outbursts of anger, hostility, etc. That is, PProfile could alert authorities to people who would potentially be a threat if they were to obtain a gun.

PProfileProfessional

PProfileProfessional is a specialized PProfile service covering a user's professional life. There is an entire universe of profile components that have never before been available for measurement which, because of PProfile, would now be available.

For example, in "Emotional Intelligence" pages 160-161, Daniel Goleman states the following:

"The single most important factor in maximizing the excellence of a group's product was the degree to which the members were able to create a state of internal harmony . . . ."

"Internal harmony" is directly related to the personalities of the members of the group and to how well the different personalities fit together.

Consequently, PProfileProfessional could be used, for example, in the following way.

Consider a large organization with many employees. Assume that all the employees are users of PProfile. When a new project is to start and management wants to assemble a group to work on it, PProfileProfessional could be employed to help pick the group members based on how well the personalities, i.e., profiles, fit together.

PProfileResume

A person becomes a client of the PProfile Service. PProfile collects empirical data about the user. Some of this data is personal. Some of it is professional/employee, e.g., work experience. The user can ask PProfile to confirm his work experience/Resume to authorized third parties, e.g., business clients, new employers, etc.

PProfileAccess

When a person is a user of the PProfile Service, PProfile collects empirical data about the person. The person can ask PProfile to allow third parties access to parts this data and/or parts of the analysis. The access of the information comes with conditions, such as:

The user, and only the user, can authorize access to his data.

The user can change neither the data nor the analysis.

PProfileBusiness

This specialized application of the PProfile service would be directed to business people.

Instead of a person telling who they are, PProfileBusiness would observe the person and then determine who they are. That is, just as with dating, the question that comes up when you first meet a person in business is this: Is this person really who he says he is? In social media and in the real world, people paint portraits of themselves as one thing. But, the reality of who they are may be very different.

PProfile creates the profile by gathering empirical data and then analyzing it as described previously in the specification. Then, with the authorization of the person, PProfileBusiness can make his business profile available to third parties.

The following are two methods of employing PProfileBusiness:

a. PProfileBusiness could be run as a social media service. A user could develop a business portrait of himself. However, the PProfileBusiness portrait would have to be consistent with the user's profile. That is, PProfile could ensure that the information entered was accurate. The user could then authorize third parties to view this portrait.
 b. PProfileBusiness is used to vet information the user has entered into other services. This could be done as an app running on the other service. Or, it could be done when a third party downloads information from the other service and then asks PProfileBusiness for verification. Once the user authorizes it, PProfileBusiness could provide the verification.

PProfileTimeRestricted

Some people will want to only be observed at certain times of the day. So, for example, some users might only allow PProfile to gather data while they are at work. Other users might only allow PProfile to gather data while they are away from work.

PProfile could offer a service that limits when empirical data is collected. This will be notes in any data that PProfile is authorized to be shared with third parties.

PProfileDeviceRestricted

Some people will want to only be observed while using certain devices. So, for example, some users might only allow PProfile to gather data from devices that are owned by the user, i.e., no data is gathered from devices used at work.

PProfile could offer a service that limits which devices are used for empirical data This will be notes in any data that PProfile is authorized to be shared with third parties. collected.

PProfileDriving

PProfileDriving is a service that determines a person's driving profile. A person's driving profile is not just about the number of speeding tickets he has gotten. The person's driving profile is about all the behaviors, physiological responses, and emotions responses that the person exhibits while driving. These affect the person's driving skills.

This profile could be determined by PProfile. For example, assume that a microphone and a camera were to be placed into the driving's compartment. The driver's facial and voice affect could be correlated with his actions, the car speed, the speed limit, and other empirical data.

PProfile could alert the user that he is exhibiting certain behaviors that are detrimental to safe driving or that have gotten him into trouble before. These could also be used by insurance companies.

PProfileBoyMeetsGirl

PProfileBoyMeetsGirl is a service that could be used by a boy and a girl who are both users of the PProfile Service. Assume that these two people have just met and that the girl is wearing Google Glass. PProfile could provide the girl with metadata on what the boy says to her. For example, if he tells her that he knows people influential in her profession, then PProfile can either confirm or reject his statement through a callout visible through Google Glass. This would have to be authorized by the boy. In addition, Google Glass could be combined with Facial Affect software to further assist in this interaction.

Facial Recognition software has been suggested for Google Glass. However, PProfileBoyMeetsGirl adds an entirely new dimension to Google Glass: Character Recognition.

PProfileForensic

PProfile could be used to study medical conditions such as suicide. For example, if a PProfile user commits suicide, then the data in his PProfile account could be accessed. Reviewing this data would be similar to observing the person in intimate detail. It would give clinicians data that they have never had before.

PProfileInteraction

PProfile could be used to interact with the user in real time. For example, if the user is exhibiting a specified behavior detected through the empirical data gather by PProfile, then the PProfile System can react and interact with the user. For example, the System could interact with the user by sending him messages that try to modify his behavior.

PProfile could also be used to conduct experiments with the user. For example, if the PProfile System detects that the user is in a specified environment, the System can interact with the user and see how he responds. One method of doing this is through text messages or callouts on Google Glass.

Recently it has been found that ultrasound could effect a person's mood. (See "Good vibrations: Mediating mood through brain ultrasound" Medical Press, Jul. 17, 2013). Consequently, another way to modify a user's behavior would be for him to wear a device similar to Google Glass that is equipped with an ultrasound transducer. The message sent to the user would be a command to the transducer to emit a particular ultrasonic signal that would modify the user's mood.

PProfileTalent

PProfile could be used to determine where a person's true talents are. This could be accomplished, for example, by observing
- physiological and emotional responses as the person is presented with new things to try
- what activities he is naturally drawn to
- what activities he spends his free time doing
- length of time spent doing these activities
- emotional state while doing these activities.

PProfileSurvey

PProfile never releases a user's data without authorization from the user. However, PProfileSurvey could scrub all the personal identification data from the empirical data. PProfileSurvey could then draw conclusions about the population as a whole by adding together scrubbed data from many users. PProfile could be used to spot trends in the population as a whole.

PProfileMessagingServices

PProfileMessagingServices is a service that generates message to a user based on his profile and his empirical data. The message could be at the request of the user; for example, the user could request that PProfileMessagingServices send him a message if it detects that he is behaving in a certain way. Or, the message could be from, for example, law enforcement authorities, parents, etc.

PProfileArchive

PProfileArchive is a service that allows a user to view all the material that PProfile has archived on him. This would be valuable to the user. He could assess his own life. And, he could do self-searches through his own material to determine, for example, what information companies could have gathered about him.

PProfileSpecializedProfiles

For some purposes, it would be helpful to group the set of profile components into subsets. The following are examples of possible subsets:
- Character Profile Components
- Psychological Profile Components
- Professional Profile Components
- Business Profile Components
- Financial Profile Components
- Consumer Profile Components
- Medical Profile Components
- Genetic Profile Components Based on these subsets of profile components, sub-profiles can be defined. These sub-profiles would include, for example, the following:
- Character Profile
- Psychological Profile
- Professional Profile
- Business Profile
- Financial Profile
- Consumer Profile
- Medical Profile
- Genetic Profile
- Personality
- Emotional PProfileSocialNetwork This application of PProfile could use the profile of others to assist in determining the profile for a user. For example, the depth of a PProfile user's social network could be determined by such things as:
- the number and the quality of the people that seek out his advice.
- the number and the quality of the people that the user seeks out to consult with.

As another example, a person may be known by his enemies as much as by his friends. If PProfile has the profiles of a user's enemies and of his friends, then these could help in developing a profile of the user.

PProfileSocialNetwork could also be of help in psychotherapy. That is, a therapist would know about the people that a patient is dealing with if these other people are also members of PProfile.

PProfilePublic

PProfilePublic is a service that allows registered users of the PProfile System to post user-specified public-information for other registered users of the PProfile System to see. This public-information is call his Post.

The Post can contain, for example:
- part of the user's Profile.
- something that he wants the public to know about him.
- something that he is looking for.

The user is totally free to select portions of his profile and other information for his Post, and to change these selections at his pleasure. The only limitation on these selections is that Profile elements cannot be altered by the user.

The user can choose not to Post any information. He can also restrict the group of registered PProfile users who are shown the Post to those that satisfy criteria set by him.

The PProfilePublic Service could be implemented as a website hosted by the PProfile System's CCS.

The following is a specific example of a PProfilePublic Service related to use of a head-mounted display (HMD), sometimes referred to as a heads-up display. Head-mounted displays may include specialized glasses or headgear with features such as the following:
- head-mounted display/heads-up display
- smart phone
- range finder
- camera
- compass
- geographic location equipment (GPS, cell phone, etc.),
- microphone
- RFID hardware
- highly directional EM antenna
- nondirectional EM antenna The HMD may be in communication with the PProfilePublic Service through, for example, wi-fi or cell phone internet access. Although the specific example given below utilizes an HMD, creating and displaying a post could be accomplished using other personal digital devices, such as a smart phone for example.

Figure 5:
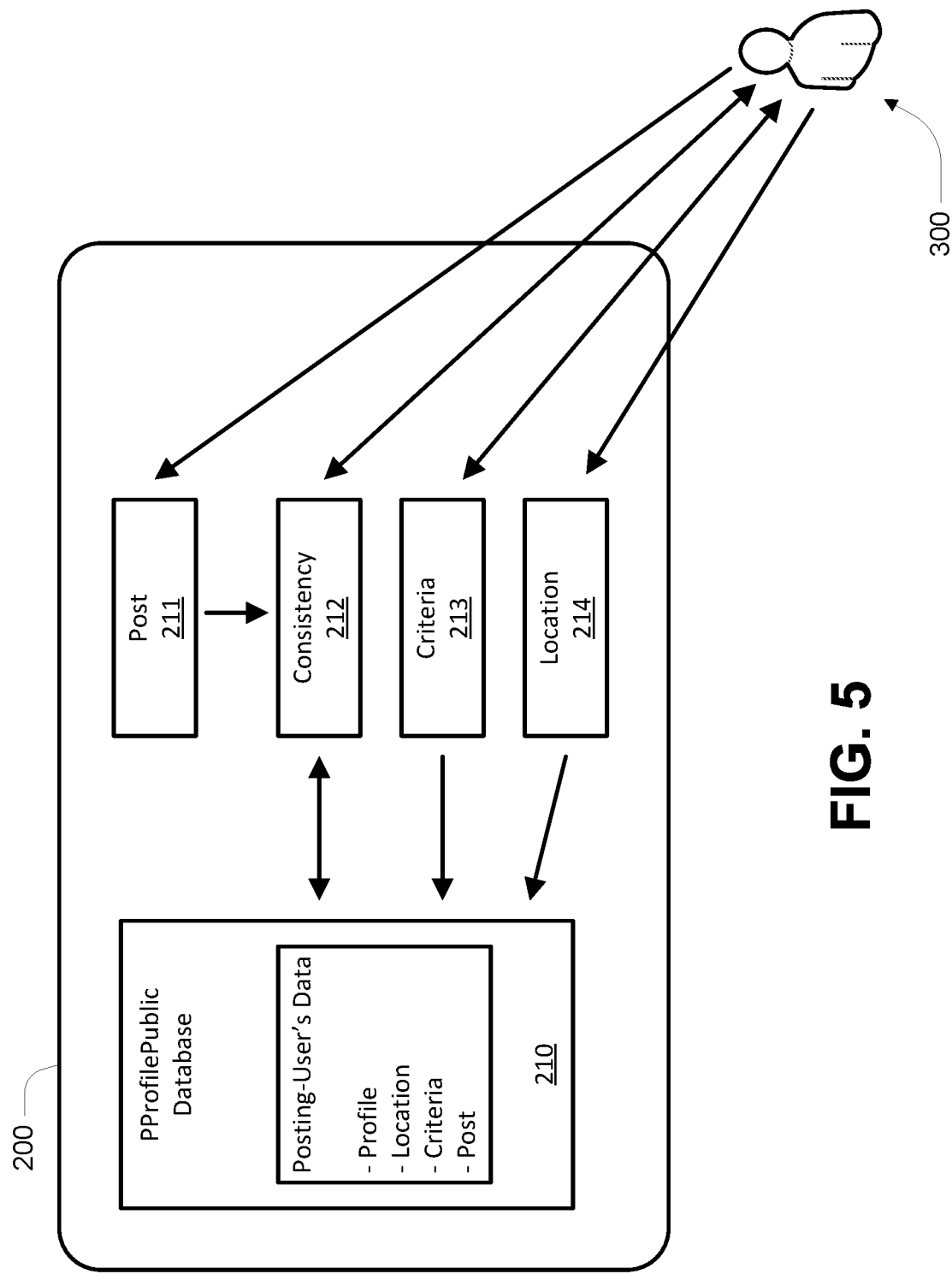
FIG. 5 illustrates hardware and software interactions for creating a post in accordance with an embodiment.

FIG. 5 illustrates hardware and software interactions for creating a post in accordance with an embodiment. FIG. 5 depicts a computer system (e.g., central computer system or CCS) 200. CCS 200 may contain the same subunits as CCS 110 of FIG. 1. In addition, CCS 200 is depicted to include a database (e.g., PProfilePublic Database) 210. The database 210 may include, for each registered user of the PProfilePublic Service:

Profile
Current geolocation of the user
Authorization Criteria
Post

CCS 200 may further include Post Software 211 providing, in conjunction with other subunits of CCS 200 (such as communications units 111, processing units 112 and storage units 113 of FIG. 1) means to allow a user to post information. By accessing the PProfilePublic Service (e.g., through a website or other portal), the posting user can specify what information he wants to post on the PProfilePublic Service. This information could be, for example, public-information items listed above.

One way for the PProfilePublic Service to enable the posting-user to create a PProfilePublic Post is to present the user with an electronic posting-form with, for example, the following fields:

Marital Status
Age
Profession
A yes/no check-off box for inclusion of each element of the user's profile.
Instant Post (This is a short user-specified message.)

The information that he enters into these fields will become his PProfilePublic Post.

CCS 200 may further include Consistency Software 212 providing, in conjunction with other subunits of CCS 200 (such as communications units 111, processing units 112 and storage units 113 of FIG. 1) means to check for consistency. For example, once information is entered into the posting-form, the PProfilePublic Consistency Software 212 might check the information for consistency with the posting-user's PProfile System profile. If the Post is found to be inconsistent with the posting-user's profile, then the PProfilePublic Software may notify the posting-user that the Post cannot be posted. For example, if a user enters "single" in the Marital Status line when his profile lists him as married, then the post could be rejected by the PProfilePublic Software.

The posting-user may be permitted to access the PProfilePublic section of the PProfile System website and to change the Post at any time. The user could do this in the traditional way, i.e., through the website. He could also do this by commands to speech-recognition software in his HMD, for example.

CCS 200 may further include Criteria Specification Software 213 providing, in conjunction with other subunits of CCS 200 (such as communications units 111, processing units 112 and storage units 113 of FIG. 1) means to permit a user to set criteria to restrict access to the post. For example, at the PProfilePublic section of the PProfile System website, the posting-user may be presented with an electronic Criteria Specification Form. He may use this form to set the criteria that a viewing-user must satisfy before the PProfilePublic Service will display the posting-user's Post to him. In other words, the posting-user selects, through criteria, who will see his Post. PProfilePublic may enforce this selection by demanding that the viewing-user's profile satisfies the posting-user's criteria.

The form could include fields that reflect what the wishes of the posting-user are at that time. For example, a single man who was looking for a social connection on a particular night might include fields such as the following:

| FIELD | CRITERIA SPECIFICATION |
|---|---|
| Sex | Female |
| Status | Single |
| Age Range | 25-30 years old |
| Height Range | 5' 6" to 5' 10" |
| Weight Range | 130 lbs to 150 lbs |
| Education | College |
| Character Evaluation | Honest |
| Behavior Pattern | Rides motorcycles |
| Psychological Profile | A DSM Category |
| Radius | 200 feet |

The PProfilePublic Service would then transmit the posting-user's post only to viewing-users that meet the above criteria.

Note that the Post is not displayed to a viewing-user by name of the viewing-user, in this example. Rather, it is displayed to any user, in the geographic vicinity, who satisfies the specified criteria. However, the criteria could permit the posting-user to display Posts to a group of viewing-users that is determined by things other than geographic vicinity.

In addition, a feature could be included that would allow a posting-user to specify a particular person for his post, for example, his post is to be displayed to the person whose post he had just received.

CCS 200 may further include Location Software 214 providing, in conjunction with other subunits of CCS 200 (such as communications units 111, processing units 112 and storage units 113 of FIG. 1) means to locate users. For example, registered users of PProfile have data about their current geographical location transmitted to the PProfilePublic System through their digital devices. When it is received, this geolocation information may be analyzed and archived.

Figure 6:
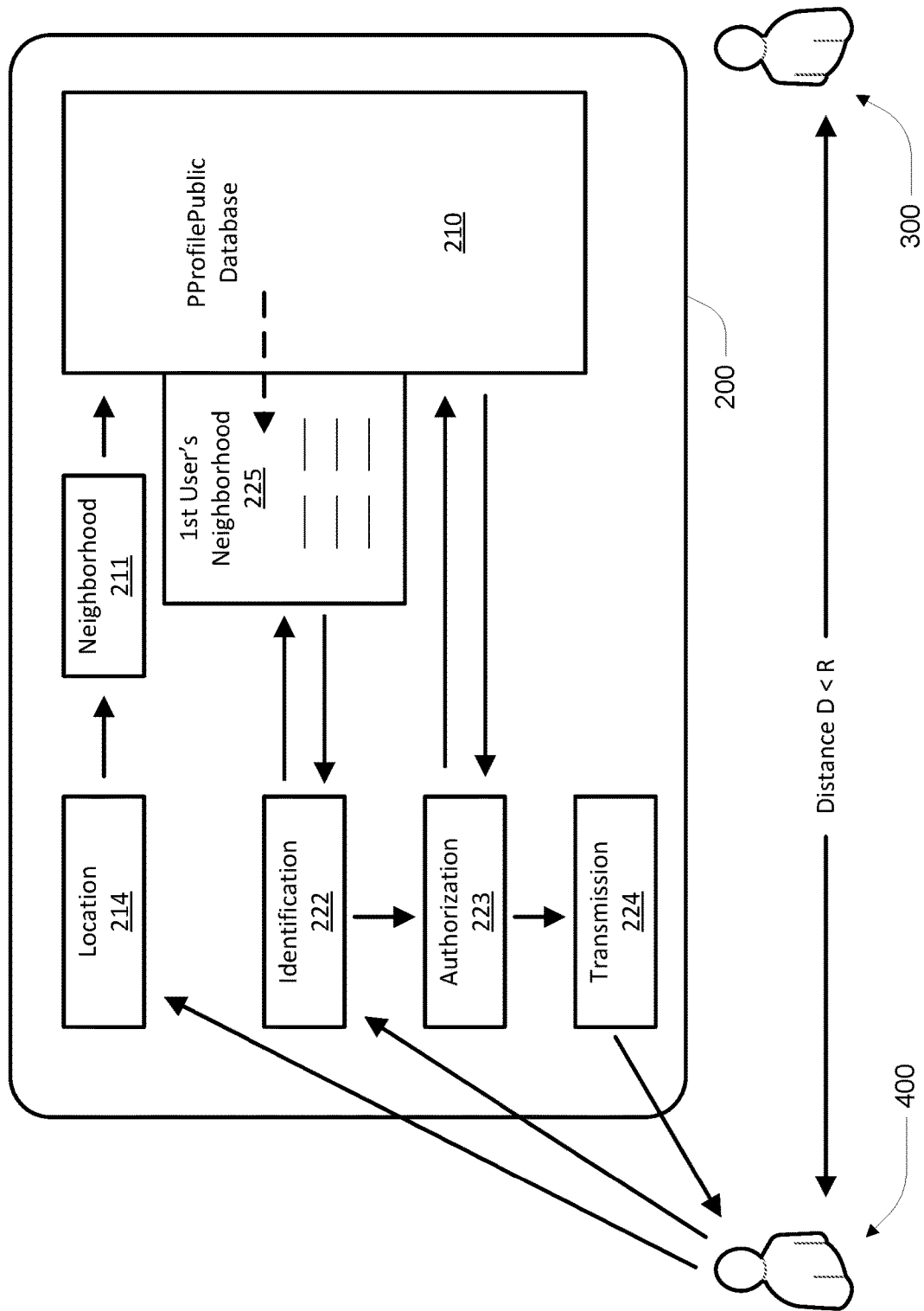
FIG. 6 illustrates hardware and software interactions for displaying a post in accordance with an embodiment.

FIG. 6 illustrates hardware and software interactions for displaying a post in accordance with an embodiment. FIG. 6 depicts the CCS 200 of FIG. 5.

CCS 200 may further include Neighborhood Software 221 providing, in conjunction with other subunits of CCS 200 (such as communications units 111, processing units 112 and storage units 113 of FIG. 1) means to identify nearby users. For example, as a registered user's geolocation data comes into PProfilePublic, the service may search the PProfilePublic database to find other users who are within a radius R of the registered user's location. The group of users that are within radius R of the registered user's location is called the user's Neighborhood 225.

CCS 200 may further include Identification Software 222 providing, in conjunction with other subunits of CCS 200 (such as communications units 111, processing units 112 and storage units 113 of FIG. 1) means to identify specific nearby users. For example, the PProfilePublic Service must be able to identify specific users of the PProfile System who are within the viewing-user's Neighborhood from data transmitted by the viewing user, e.g., the criteria. Several methods can be employed to do this. Five of them are detailed are detailed below as Methods 1-5.

CCS 200 may further include Authorization Software 223 providing, in conjunction with other subunits of CCS 200 (such as communications units 111, processing units 112 and storage units 113 of FIG. 1) means to restrict transmission of a posting user's Post. For example, the PProfilePublic Service might only transmits a posting user's Post to viewing-users that meet his designated criteria.

Once a person has been identified as being a PProfile registered-user in the Neighborhood of a viewing-user, a search is done of the PProfilePublic data base to find the person's Post and the person's criteria for viewing the Post.

The Authorization software then searches the PProfilePublic database for the viewing-user's profile. When this is found, the Authorization Software checks to see if the viewing-user's profile satisfies the posting-user's criteria.

If the profile does not satisfy the criteria, then the Post is not shown to the viewing-user.

If the profile does satisfy the criteria, then the Post is sent to the Transmission Software.

In summary, when the PProfilePublic receives a signal from a viewing-user requesting a posting-user's Post, the Authorization Software checks the posting-user's criteria against the viewing-user's Profile to see if the viewing-user satisfies the posting-user's criteria before it transmits the Post.

CCS 200 may further include Receiving/Transmitting (R/T) Software 224 providing, in conjunction with other subunits of CCS 200 (such as communications units 111, processing units 112 and storage units 113 of FIG. 1) means to transmit and receive Posts. The R/T Software 224 receives information from a viewing user's head-mounted display device. The R/T Software also transmits a posting user's Post to a viewing user. The Post could be in the form of, for example, an email, a text message, a Tweet, or visual display message for the viewing user's HMD.

Display Software

The PProfilePublic Display Software receives the Post from the PProfilePublic Service. The Display Software may then display the Post on the user's HMD.

Consider the situation where a group of people are registered users of the PProfile System. Some of them have decided to make information available to the public through the PProfilePublic Service. That is, some of them have each created a PProfilePublic Post. In addition, at least some of the registered users each have a digital device that, from time-to-time, transmits information identifying the geographic location of the user to the PProfile System.

As a specific example of the HMD Embodiment of the PProfilePublic Service, assume that a 1st user (i.e., user 400) is walking in a public area and is wearing an HMD.

The HMD transmits geographic location data of user 400 to PProfilePublic.

User 400's Neighborhood Is Determined

When the geographic location data is received by PProfilePublic, it checks its database to determine which other registered users are within a radius R of user 400's geographical location. The radius R can be set, in the PProfilePublic Software, by user 400 or by the PProfilePublic Service. The group of registered users within a radius R of the user 400 is called user 400's Neighborhood 225.

User 400 looks at a person (e.g., 2nd user 300) who is at a distance D from the user 400. (Assume that D<R.)

Identification of the Person as a registered PProfile System user

Either automatically or by command of user 400, the PProfile System tries to determine if the person is a member of the group of registered users in Neighborhood 225. There are several methods by which to accomplish this, for example:

Method 1

(For this method to work, each of the users must be assigned a unique bar code. And, PProfilePublic must include bar code reading software.) The person wears a bar code or a data matrix code that can be scanned by the $1^{st}$ user's head-mounted display device's camera. This information is sent to PProfilePublic. When the bar code information is received by PProfilePubic, PProfilePublic searches the bar codes assigned to the registered users in the $1^{st}$ user's Neighborhood looking for a match.

Method 2

Radio-Frequency Identification (RFID): Mobile devices, of PProfile System's registered users, can be equipped with RFID hardware and software. This will allow the PProfile System to identify the person. For this method to work, each of the users must be assigned unique RFID information. When the RFID information is received by PProfilePubic, PProfilePublic searches the RFID information assigned to the registered users in the 1st user's Neighborhood looking for a match.

Method 3

(For this method to work, each of the users must be assigned a unique electromagnetic identification signal. And, personal digital devices must include electromagnetic-identification signal transmission/detection hardware and software.) A unique identification signal is radiated from a digital device of the person. This is received by the digital device of the 1st user. Once the information is received, it is transmitted by the 1st user to PProfile. When the electromagnetic signal information is received by PProfile, PProfile searches the electromagnetic signal information assigned to the registered users in the 1st user's Neighborhood looking for a match.

Method 4

The PProfile System knows the geographic location of the all the PProfile users within the radius R very accurately. The head-mounted display device may be equipped with a rangefinder. Using the rangefinder gives the distance from the 1st user to the person. The PProfile also knows the direction in which the 1st user is looking. This is determined by using the compass feature of smart phones. Once the range and direction information is received by PProfilePublic, PProfilePublic searches the location information of each of the registered users in the 1st user's Neighborhood looking for a match.

Method 5

The PProfilePublic knows the geographic location of the all the registered PProfile users in the 1st user's Neighborhood. PProfilePublic keeps a data base of facial images of its registered users. Using the head-mounted display device's camera, an image of the 2nd person is transmitted to the PProfilePubic. Once the facial image is received by PProfilePublic, PProfilePublic searches the facial images of each of the registered users in the 1st user's Neighborhood looking for a match, by using facial recognition software.

There are only two possible results of this attempt at identification: either PProfilePublic can identify the person as a $2^{nd}$ user 300 in user 400's Neighborhood 225, or it cannot. If the PProfilePublic cannot identify the person, then a message stating this is sent to user 400's HMD for display. If PProfilePublic can identify the person as a $2^{nd}$ user 300 in user 400's Neighborhood 225, then PProfilePublic employs its Authorization Software 223 to search for a Post from user 300, and to search for the associated criteria set by user 300 for viewing the Post.

If there is no Post, then the PProfilePublic Service sends a message stating this is sent to user 400's HMD for display. If there is a Post, then PProfilePublic's Authorization Software 223 checks to see if user 400's profile meets the criteria set by user 300 for the transmission of user 300's Post to user 400. If there is a Post, but user 400 does not meet user 300's criteria, then a message stating this is sent to user 400's HMD for display. If there is a Post and user 400's profile meets user 300's criteria, then the Post is transmitted to user 400's HMD for display. For example, the Post may be displayed in user 400's field of view near user 400's view of user 300. In addition, if user 300's Post is displayed to user 400, a message can be sent to user 300 notifying him of this.

Note that the identity of user 300 is not given to user 400 by the PProfilePublic Service unless user 300 makes it part of his Post. The only information that is given to user 400 is the information that user 300 has decided to post.

If a PProfilePublic Post is shown to user 400, then user 400 knows that there is a match between them on at least some level. So, for example, this would have immediate applicability to gatherings where people try to network.

One of the most interesting possibilities presented by the HMD Embodiment of PProfilePublic Service is that it would allow two strangers, who are both walking in an urban environment, to start a conversation in a convenient and comfortable way.

What is claimed is:

1. A computer system, comprising
a communication unit;
   wherein the communication unit is configured to receive instances of empirical data from a plurality of digital devices that are associated with a particular person;
      wherein at least some of the received instances of empirical data are gathered from at least one of ambient observations of the particular person by the plurality of digital devices; and interactions between the computer system and the particular person; and
      wherein each received instance of empirical data comprises one or more portions of data; and
   to transmit digital messages to at least one of the digital devices of the plurality of digital devices that are associated with the particular person;
a processing unit;
a storage unit;
   wherein the storage unit comprises at least
      an assemblage of data comprising a plurality of key items,
         wherein each key item of the plurality of key items is an item having a data type corresponding to a data type of a portion of data of an instance of empirical data to be received by the communication unit,
         wherein the plurality of key items comprises image data of the particular person and voice data of the particular person; and
         wherein each key item of the plurality of key items has at least one associated family of items, wherein a particular associated family of items of the at least one associated family of items is associated to its associated key item of the plurality of key items by relevance to one particular behavior such that every item in the particular associated family of items, when paired with the key item, forms a pair that is relevant to the one particular behavior; and
an archive unit;
   wherein the archive unit comprises at least one type of information for the particular person selected from a group consisting of:
      pertinent facts about the particular person,
      empirical data gathered from the particular person's digital devices,
      results of prior empirical data correlation processes,
      results of prior analyses of gathered empirical data, and
      prior identified behavior data-points;
wherein the computer system is configured by software to perform a process of correlating instances of empirical data to identify an instance of a behavior, the behavior-identification-process comprising:
   receiving a first instance of empirical data ($ED_A$) associated with the particular person;
   searching the archive unit for information about the particular person that may be relevant to $ED_A$ vis-à-vis one particular behavior;
   receiving, from the archive unit, a second instance of empirical data ($ED_B$) associated with the particular person from a digital device in the presence of the particular person;
   identifying the portions of data in $ED_A$ and in $ED_B$;
   determining whether there is a match of an identified portion of data ($P_{A\mu}$) of $ED_A$ to a key item of the plurality of key items in the assemblage of data;
   for a matched key item, using the particular associated family of items of the matched key item to search for a match between a member of the particular associated family of items of the matched key item and an identified portion of data ($P_{B\nu}$) of $ED_B$; and
   correlating $ED_A$ with $ED_B$ as being potentially relevant to each other vis-à-vis the one particular behavior of the particular associated family of items in response to at least one $P_{B\nu}$ of $ED_B$ matching a member of the particular associated family of items of the matched key item for $ED_A$; and
   analyzing the correlated instances of empirical data, $ED_A$ and $ED_B$, to determine if it identifies an instance of the one particular behavior of the person as observed by the computer system;
      wherein determining that the correlated instances of empirical data, $ED_A$ and $ED_B$, identifies an instance of the one particular behavior comprises determining if the instances of empirical data, $ED_A$ and $ED_B$, are pairwise relevant to each other vis-a-vis the one particular behavior;
         wherein pairwise relevance of $ED_A$ to $ED_B$ is determined by comparing the portion, $P_{A\mu}$, of $ED_A$ to the portion, $P_{B\nu}$, of $ED_B$, for a particular relationship;
         wherein the particular relationship is one member selected from a group consisting of consistency and inconsistency;
         wherein the correlated instances of empirical data, $ED_A$ and $ED_B$, are identified as an instance of the one particular behavior in response to analysis determining that the respective pair of portions, $P_{A\mu}$ and $P_{B\nu}$, have the particular relationship; and
   archiving, in the archive unit, at least one type of information selected from a group consisting of:

the correlated instances of empirical data, $ED_A$ and $ED_B$,
the one particular behavior for which the instances of empirical data, $ED_A$ and $ED_B$, were correlated,
the identified instance of the one particular behavior, and
the results of the analysis of $ED_A$ and $ED_B$.

2. The computer system of claim 1, wherein the process that the computer system is configured to perform further comprises:
interacting with the particular person by transmitting at least one digital message ($ED_T$) to the particular person;
wherein the content of the at least one digital message is determined in response to at least one of:
the correlated instances of empirical data, $ED_A$ and $ED_B$, the one particular behavior, and
the identified instance of the one particular behavior;
wherein the content of the at least one digital message is an experiment tailored to test validity of identifying the correlated instances of empirical data, $ED_A$ and $ED_B$, as an instance of the one particular behavior;
observing how the person responds to the at least one digital message;
wherein both the at least one digital message, $ED_T$, and the observed response by the particular person, $ED_R$, are empirical data items associated with the particular person; and
wherein $ED_T$ and $ED_R$ are relevant to each other vis-à-vis at least one of:
the correlated instances of empirical data, $ED_A$ and $ED_B$, the one particular behavior, and
the identified instance of the one particular behavior;
analyzing the pair of empirical data items, $ED_T$ and $ED_R$, to determine if it is consistent or inconsistent with, or irrelevant to, at least one of the following:
the correlated instances of empirical data, $ED_A$ and $ED_B$,
the one particular behavior, and
the identified instance of the one particular behavior;
refining the behavior-identification-process, for the particular person, by updating the behavior-identification-process;
wherein updating the behavior-identification-process comprises:
archiving, in the archive unit, at least one type of information selected from a group consisting of:
the correlated instances of empirical data, $ED_A$ and $ED_B$,
the identified instance of the one particular behavior,
the one particular behavior,
the pair $ED_T$ and $ED_R$, and
the results of the analysis of $ED_T$ and $ED_R$.

3. The computer system of claim 2, wherein the process that the computer system is configured to perform further comprises:
receiving a subsequent instance of empirical data, $ED_{A2}$, associated with the particular person from one of the digital devices in the presence of the particular person, after receiving the first instance of empirical data, $ED_A$;
identifying the portions of data in $ED_{A2}$;
searching the archive unit for information about the particular person that may be relevant to the received subsequent instance of empirical data $ED_{A2}$ vis-à-vis the one particular behavior;
receiving, from the updated archive unit,
at least one instance of empirical data, $ED_{B2}$, associated with the particular person from a digital device in the presence of the particular person,
the correlated instances of empirical data, $ED_A$ and $ED_B$,
the pair $ED_T$ and $ED_R$, and
the results of the analysis of $ED_T$ and $ED_R$
using the results of the analysis of $ED_A$ and $ED_B$, and of $ED_T$ and $ED_R$, in the analysis of $ED_{A2}$ and $ED_{B2}$ in identifying them as an instance of the one particular behavior.

4. The computer system of claim 2, wherein the content of the at least one digital message ($ED_T$) is further determined using rules and techniques selected from one of a group consisting of
Cognitive Behavioral Therapy,
Professional schools of psychology and psychotherapy,
personality testing, and
Neuro-Associative Conditioning Systems (NACS), and
the Gottman Institute.

5. The computer system of claim 1, wherein the one particular behavior comprises an observable selected from a group consisting of a behavior, an action, an activity, and an emotion.

6. The computer system of claim 5, wherein the process that the computer system is configured to perform further comprises:
transmitting an additional digital message ($ED_P$);
wherein the content of the additional digital message is determined in response to at least one of:
the correlated instances of empirical data, $ED_A$ and $ED_B$,
the identified instance of the one particular behavior,
the one particular behavior, and
wherein the content of the additional digital message ($ED_P$) is at least one of text, voice, and image.

7. The computer system of claim 6, wherein the content of the additional digital message is further determined using rules and techniques selected from one of a group consisting of:
Cognitive Behavioral Therapy,
Professional schools of psychology and psychotherapy,
personality testing,
Neuro-Associative Conditioning Systems (NACS), and
the Gottman Institute.

8. The computer system of claim 7, wherein the content of the another digital message is further designed to assist the particular person in a self-improvement program to take responsibility for his own health.

9. The computer system of claim 6, further comprising:
wherein the particular person is a patient;
wherein at least some of the data in the correlated instances of empirical data, $ED_A$ and $ED_B$, are data that were gathered when the patient was away from a healthcare clinic;
wherein the one particular behavior is one of:
a behavior that is compliant with instructions given to the particular person by a healthcare provider; and
a behavior that is non-compliant with instructions given to the particular person by a healthcare provider; and
wherein the another digital message is sent to at least one of the particular person, a parent of the particular person when the particular person is a child, and the particular person's healthcare provider.

10. The computer system of claim 9, wherein the one particular behavior is related to prescribed instructions given to the particular person by a healthcare provider.

11. The computer system of claim 10, further comprising:
wherein the another digital message comprises real time feedback sent to the patient having content determined in response to at least one of:
the correlated instances of empirical data,
the identified instance of the one particular behavior, and
the one particular behavior.

* * * * *